United States Patent [19]

Baker et al.

[11] 4,021,009
[45] May 3, 1977

[54] VERTICAL PATH CONTROL FOR AIRCRAFT AREA NAVIGATION SYSTEM

[75] Inventors: Donald H. Baker; Larry J. Bowe; Kenzel P. Manning, all of Phoenix; William C. Post, Scottsdale, all of Ariz.

[73] Assignee: Sperry Rand Corporation, New York, N.Y.

[22] Filed: July 24, 1975

[21] Appl. No.: 598,904

[52] U.S. Cl. .......................... 244/180; 235/150.22; 244/183; 244/186
[51] Int. Cl.² .......................................... G05D 1/08
[58] Field of Search ................. 235/150.27, 150.26, 235/150.2, 150.22; 244/77 A, 183, 184, 185, 186, 187, 188, 180

[56] References Cited

UNITED STATES PATENTS

| | | | |
|---|---|---|---|
| 3,691,361 | 9/1972 | Perkins | 235/150.27 |
| 3,705,306 | 12/1972 | Lydon | 244/77 D |
| 3,786,505 | 1/1974 | Rennie | 235/150.27 |
| 3,848,114 | 11/1974 | Campbell | 235/150.26 |

*Primary Examiner*—Trygve M. Blix
*Assistant Examiner*—Reinhard J. Eisenzopf
*Attorney, Agent, or Firm*—Howard P. Terry; Albert B. Cooper

[57] ABSTRACT

In the vertical path control of an area navigation system when the aircraft ascends or descends to a waypoint with an "at-or-above" or "at-or-below" altitude requirement, vertical steering is effected at a constant airspeed with regard to a reference airspeed. An alert device is included to provide a warning to the pilot when the aircraft flight path angle is less than the straight line flight path angle to the waypoint for "at-or-above" waypoints or when the flight path angle of the aircraft is greater than the straight line flight path angle to the waypoint for waypoints with an "at-or-below" altitude requirement. Altitude error is displayed on a vertical deviation indicator of an aircraft flight instrument in accordance with the difference between the actual aircraft altitude and the altitude of the next waypoint having a firm altitude requirement. When the aircraft ascends or descends to a waypoint through the pressure-barometric altitude transition, flight path angles are computed and utilized as the vertical steering reference to avoid a steering discontinuity at the transition altitude. When the aircraft is on a descent path to a waypoint and an airspeed reduction is required, vertical angles are computed and utilized for generating the vertical steering signal whereby a speed reduction transition zone is included in the flight path to effect the speed reduction and make good the desired waypoint altitude.

60 Claims, 20 Drawing Figures

VERTICAL PATH CONTROL FOR AIRCRAFT AREA NAVIGATION SYSTEM

BACKGROUND OF THE INVENTION

1. Field of the Invention

The invention relates to aircraft area navigation systems (RNAV) particularly with regard to systems that provide vertical navigation control.

2. Description of the Prior Art

Prior Art RNAV systems provide vertical navigation on straight line paths from one altitude to another. Such systems have been restricted to fly vertical paths that are defined by a final altitude and a constant vertical flight path angle to that altitude. The termination altitudes are those assigned to waypoints, i.e. fixes utilized by the RNAV system for lateral navigation. One of the simplest conventional vertical paths is point-to-point navigation from one waypoint to another. The prior art RNAV systems connect the first waypoint with its associated altitude to the second waypoint with the altitude associated therewith utilizing a straight line, the system computing the flight path angle defining that line. Vertical navigation control is then based on deviations of the aircraft above or below this line.

Although such straight line navigation provides acceptable performance for many flight conditions, optimum performance is not obtained during particular specialized procedures. For example, it is often required during standard departure and arrival procedures that the aircraft cross defined waypoints "at-or-above" or "at-or-below" specified altitudes. On an "at-or-above" designation it is desirable that the aircraft climb to cruise altitude as quickly as possible to conserve fuel. The climb gradient varies with such factors as aircraft gross weight and atmospheric conditions. Under manual control such climbs are often flown at fixed airspeed or Mach number. However, if the procedure is to be predefined for the automatic navigation of a conventional RNAV system wherein the aircraft is restricted to fixed straight line flight paths, then the worst case angle for the heaviest aircraft must be selected thus diminishing performance efficiency for most aircraft or the pilot must manually select each waypoint altitude based on his estimate of aircraft performance which is an undesired pilotage task. Alternatively, with conventional RNAV systems that require the aircraft to fly a fixed vertical flight path angle when climbing or descending, depending on atmospheric conditions and weight, the aircraft may not be able to maintain the constant flight path angle requiring the pilot to disconnect the system and fly the aircraft manually.

Another problem in the vertical path control of conventional RNAV systems occurs when the altimeter reference is changed from local barometric pressure to the pressure altitude setting of 29.92 inches of mercury as the aircraft ascends through the predetermined transition altitude and conversely, when the altimeter reference is changed in the opposite direction when the aircraft crosses the transition altitude on descent. This change in altimeter reference normally takes place at 18,000 feet as the aircraft climbs or descends between altitudes near the ground and the cruise altitudes. Conventional RNAV systems utilizing straight line and constant flight path angle navigation experience a discontinuity in the vertical steering error when the barometric (baro) setting is changed due to the resulting change in the apparent altitude of the aircraft. This discontinuity causes the pilot to again disconnect the conventional RNAV system and manually maneuver the aircraft through the discontinuity from the one path to the other. Alternatively, the undesirable piloting technique of slowly changing the barometric reference so that the aircraft gradually transitions from one path to the other is utilized in the prior art systems.

An additional problem in the vertical steering control of conventional RNAV systems occurs when the aircraft descends from cruise altitude to the terminal area of an airport because of the necessity of the descending aircraft to decelerate from cruise speed to terminal area speeds during the descent to the airport. U.S. aviation regulatory agencies typically require a deceleration to 250 knots by the time the aircraft descends to 10,000 feet. Typical jet transports are generally incapable of effecting this deceleration on normal descent flight paths by merely reducing thrust. Since generally a minimum thrust is required to maintain cabin pressurization, the pilot conventionally reduces the rate of descent by decreasing the descent angle until the speed is sufficiently reduced and then resumes the descent. By the time the aircraft decelerates to the required airspeed the aircraft acquires a significant altitude error and is generally not capable of reducing the error to zero by the time the waypoint is reached. In order to perform this manual maneuver the pilot must disconnect the automatic flight control system (AFCS) from the RNAV system and/or ignore the flight director commands. Additionally with conventional RNAV systems that provide only straight line flight paths, an additional waypoint must be inserted at the transition altitude to permit the level flight path section for the deceleration, thus introducing an undesired complexity.

SUMMARY OF THE INVENTION

The invention comprises apparatus for providing continuous vertical path control of the aircraft effecting optimum aircraft performance without disconnecting the AFCS from the RNAV system and without requiring time critical pilot inputs. The invention is in an RNAV system and comprises apparatus for controlling the vertical steering of the aircraft to maintain a predetermined reference airspeed as the aircraft ascends or descends to a waypoint with an at-or-above or an at-or-below altitude requirement. A pilot alert device is actuated when the aircraft is not at least making good the straight line path from the aircraft to the waypoint altitude at the waypoint. The invention further includes apparatus for providing vertical flight path angle commands that steer the aircraft from first to second waypoint altitudes through the transition altitude whereat the altimeter barometric reference is changed between local barometric altitude and pressure altitude to provide a smooth vertical path without a discontinuity at the transition altitude. The invention further includes apparatus for computing a deceleration zone and vertical flight path angles to permit the aircraft to decelerate to terminal area speeds as the craft descends to the transition altitude at which a maximum airspeed is permitted while making good the required waypoint altitudes.

The invention provides automatic vertical control to effect smooth vertical flight paths without the need for disconnecting the system with pilot manual intervention and without the need for additional waypoints. The invention also provides signals to the vertical steering apparatus and/or indicators of the flight director type which remain centered throughout the vertical maneuvers by the autopilot or as a result of pilot response thereto.

DESCRIPTION OF THE PREFERRED EMBODIMENTS

Figure 1:
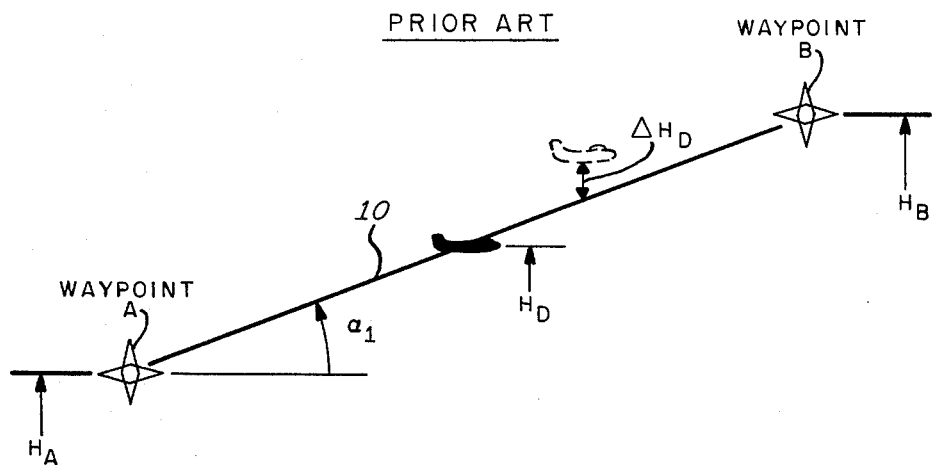
FIGS. 1, 2 and 3 are vertical flight path diagrams illustrating conventional straight line navigation of prior art RNAV systems.
Figure 2:
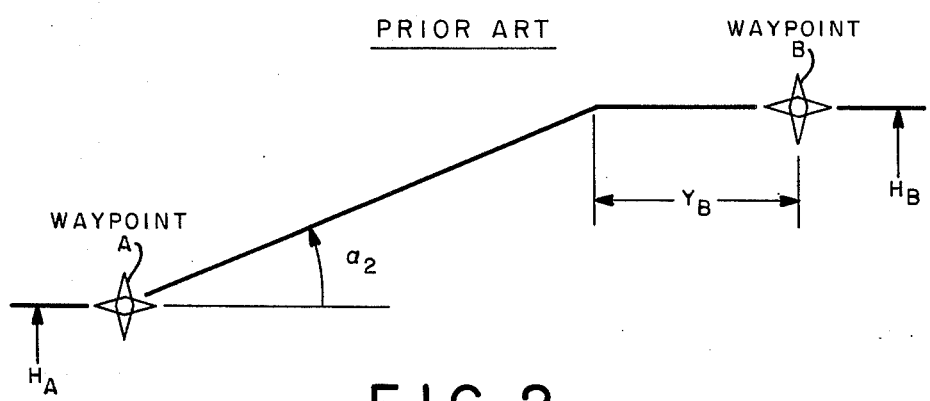
Figure 3:
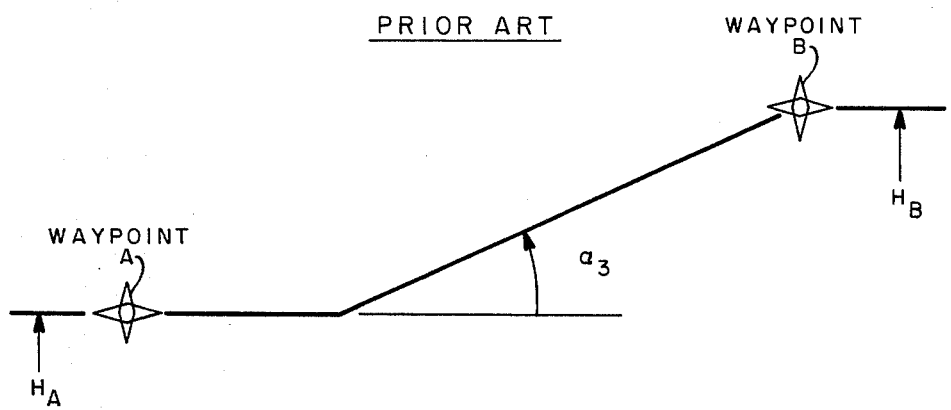

Referring to FIG. 1, a conventional vertical flight path effecting point-to-point navigation is illustrated. The conventional RNAV system connects a waypoint A having a selected altitude $H_A$ to a waypoint B having a selected altitude $H_B$ utilizing a straight line 10. The system conventionally computes the angle $\alpha_1$ which defines the straight line. The aircraft is controlled primarily in accordance with the deviation and deviation rate of the aircraft above or below the line 10 through an autopilot or through a flight director indicator, such as taught in U.S. Pat. No. 2,613,352. FIG. 2 illustrates a modification of the point-to-point navigation of FIG. 1 in which the point at which the desired altitude $H_B$ is attained is modified by an along track offset $Y_B$. This permits the selected altitude to be attained ahead of or beyond the waypoint B by the selected distance $Y_B$. The RNAV system computes in a manner similar to that described with respect to FIG. 1 the appropriate angle $\alpha_2$ for the straight line navigation. FIG. 3 illustrates a further modification of the point-to-point navigation of FIG. 1 in which a preselected vertical angle $\alpha_3$ is utilized instead of the computed angles $\alpha_1$ or $\alpha_2$ of FIGS. 1 and 2 respectively. This permits the pilot to select a desired flight path angle such as three degrees down on, for an example, an approach. In the typical point-to-point flight paths graphically illustrated in FIGS. 1, 2 and 3 as well as in the special-case flight paths of FIGS. 11, 12 and 15 of the present invention, the steering signal $\theta_c$ supplied to the pitch axis of the autopilot an/or the vertical guidance pointer of the flight director is generated from a signal proportional to the deviation $\Delta H$ of the aircraft, from the computed straight line flight path defined by the vertical angle $\alpha$, and a damping term proportional to the rate of change of the deviation $\Delta H$ in accordance with the general relationship $$\theta_c = K(\Delta H_D + \Delta \dot{H})$$

where $K$ is a gain factor which may include a function of aircraft velocity for $g$-limiting purposes. Also, an accurate $\Delta H$ term may be computed as a function of altitude rate from an air data computer, the vertical angle $\alpha$ and craft ground speed $V_G$.

In connection with the at-or-above or at-or-below flight paths of FIGS. 4, 5, 6 and 7 generated in accordance with the present invention by the apparatus of FIG. 9, the steering signal is a pitch command $\theta_c$ based primarily on the error between a reference airspeed (or Mach) and the actual airspeed (or Mach), and not on a reference flight path. However, when the waypoint is not defined as at-or-above or at-or-below, this waypoint-referenced flight path is provided by a conventional vertical steering computer 38 responsive to the parameters illustrated, viz. aircraft altitude, $H_{AC}$, waypoint altitude $H_W$, ground range D to the waypoint, and any along track offsets. The instantaneous craft altitude on this straight line flight path is computed in accordance with the generalized relationship, $$H_D = H_W - D \tan \alpha_0$$

where
$H_D$ is the instantaneous desired altitude on the straight line flight path
$H_W$ is the altitude of the approached waypoint
$\alpha_0$ is the angle of the flight path and
$D$ is the distance from the aircraft to the waypoint.

Figure 9:
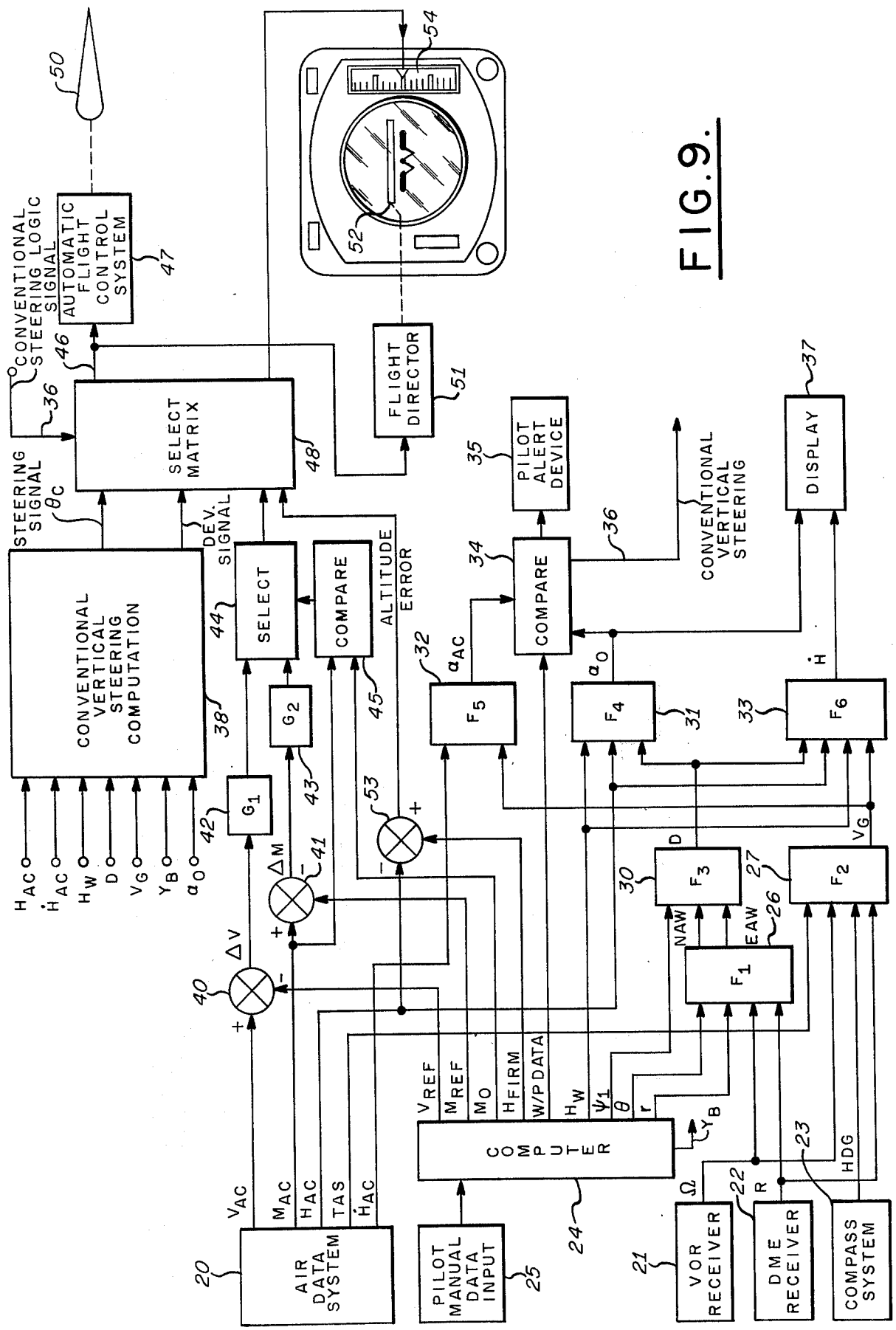
FIG. 9 is a schematic block diagram of apparatus concerning the vertical flight path control in ascending or descending to waypoints with at-or-above or at-or-below altitudes requirements in accordance with the invention.

Also computed within the "conventional vertical steering computer" 38 of FIG. 9, the steering signal $\theta_c$ is produced using in conjunction with the above parameters, aircraft actual altitude, aircraft altitude rate and flight path angle rate data, in accordance with the generalized steering signal relation set forth above.

Figure 11:
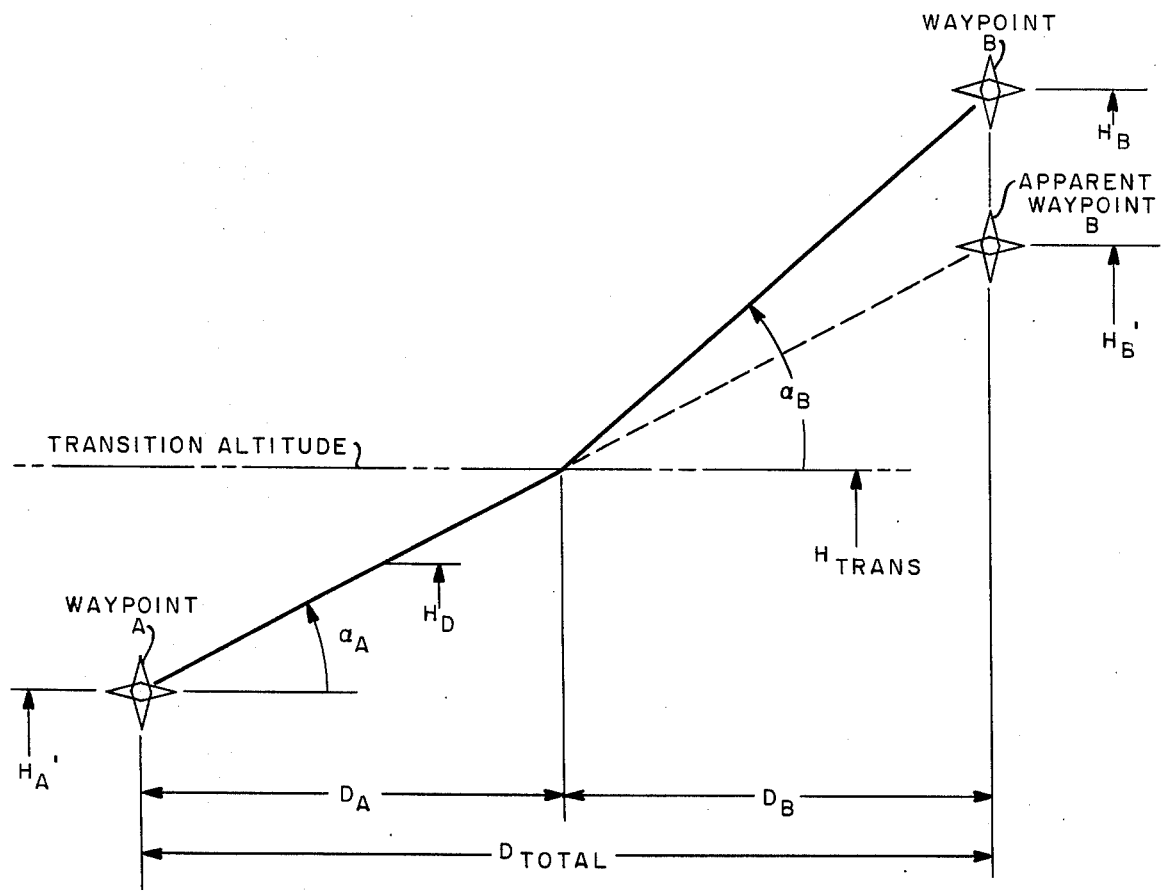
FIG. 11 is a vertical flight path diagram illustrating vertical navigation parameters with regard to ascending through the barometric to pressure altitude transition in accordance with the invention.
Figure 12:
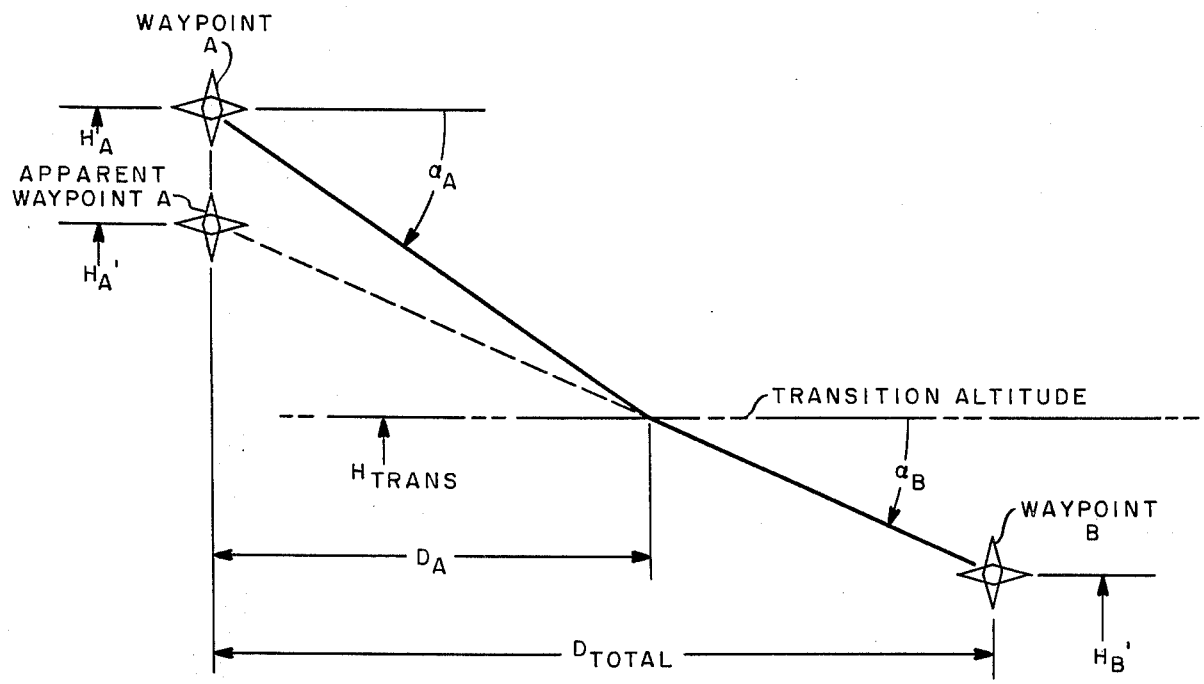
FIG. 12 is a vertical flight path diagram illustrating vertical navigation parameters with regard to descending through the pressure to barometric altitude transition in accordance with the invention.
Figure 13:
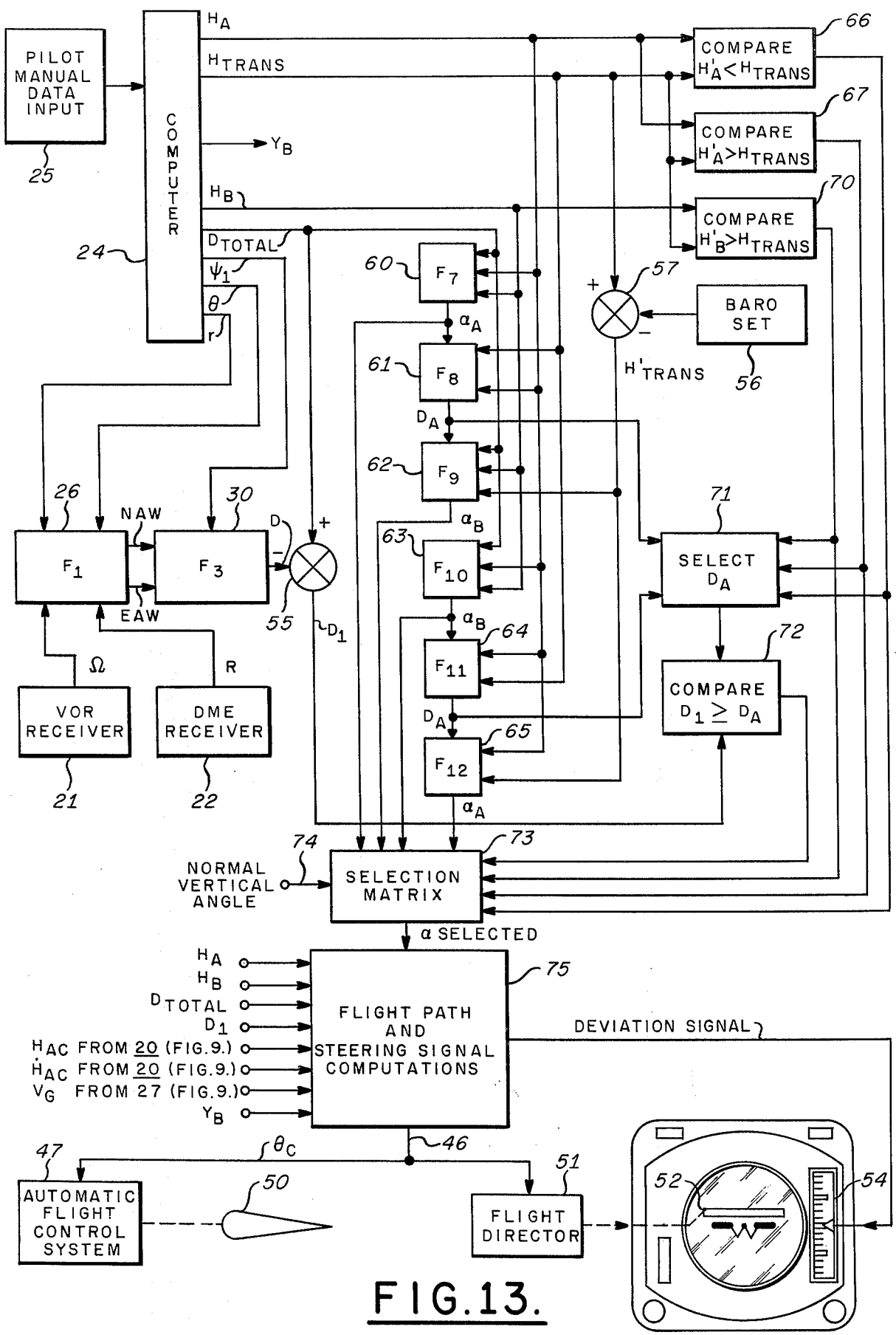
FIG. 13 is a schematic block diagram illustrating apparatus for vertical flight path control when ascending or descending through the pressure-barometric altitude transition in accordance with the invention.
Figure 15:
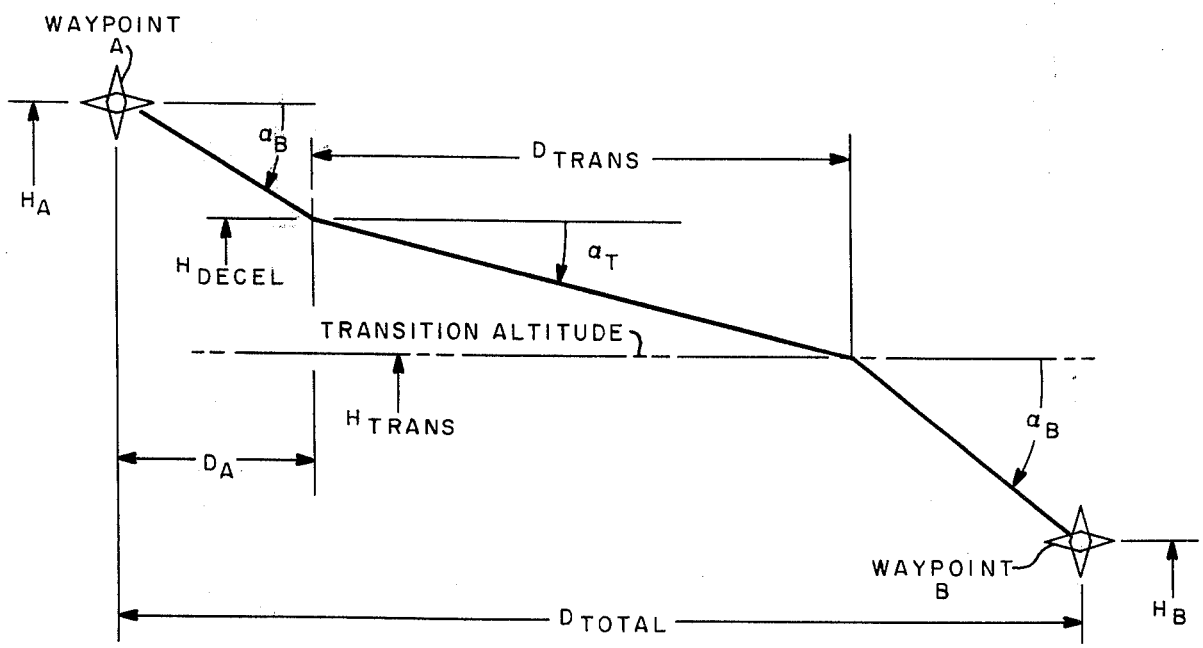
FIG. 15 is a vertical flight path diagram illustrating the vertical flight path flown in accordance with the invention for aircraft deceleration during a descent.
Figure 16:
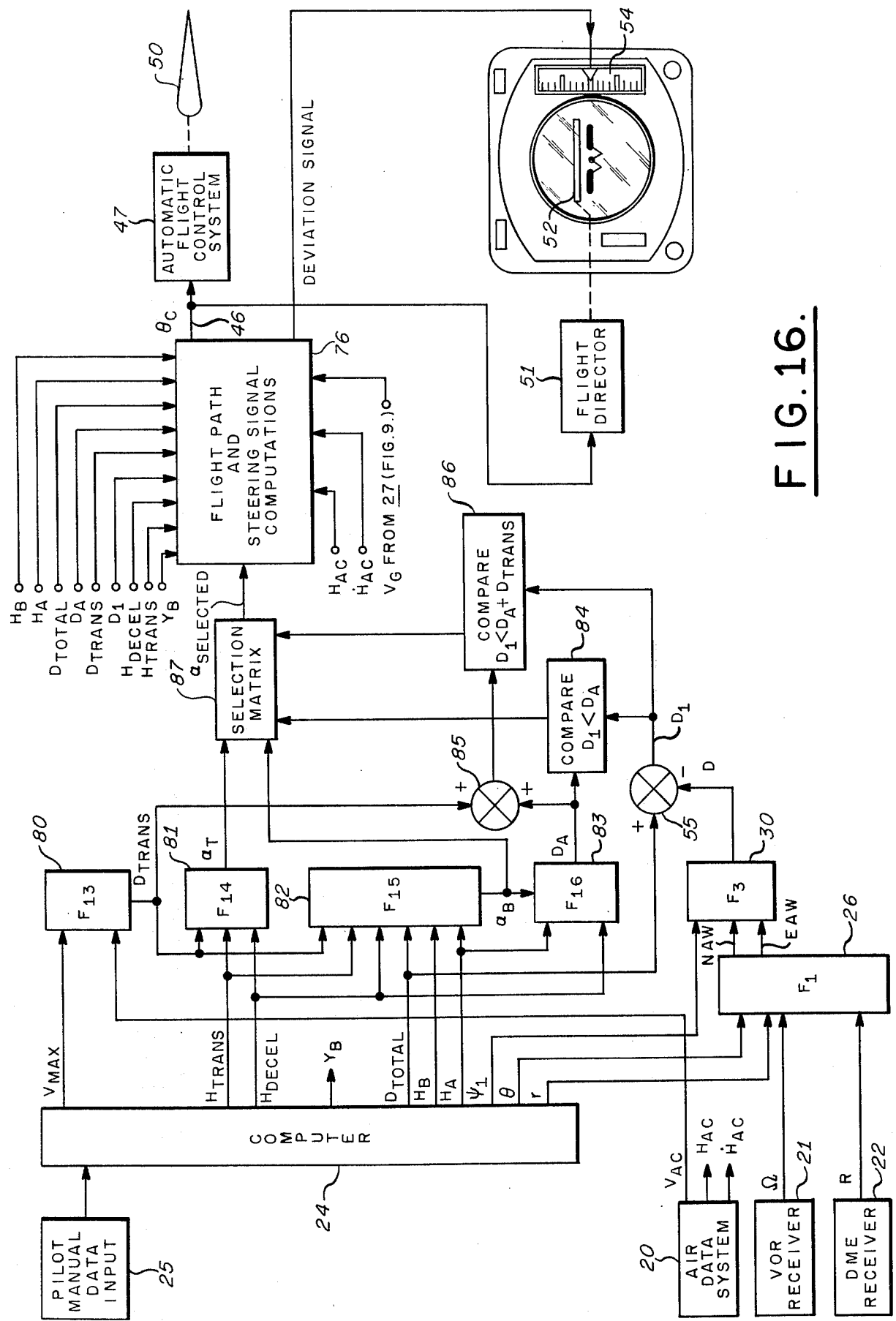
FIG. 16 is a schematic block diagram illustrating apparatus for controlling the vertical flight path for aircraft deceleration during a descent.

In connection with the transition flight paths of FIGS. 11, 12 and 15 generated in accordance with the present invention by the apparatus of FIGS. 13 and 16 respectively, the steering signal is a pitch command $\theta_c$ based on aircraft deviation from a plurality of straight line or reference flight paths determined from waypoint data and data relating to the particular transition being transversed. These flight paths and steering signals are computed by the flight path and steering signal computers 75 and 76 shown in FIGS. 13 and 16, respectively.

For example, with respect to the baro-to-pressure altitude transition, two straight line flight paths are computed, one referenced to a pre transition flight path angle and distance to the approached waypoint and one referenced to a post transition flight path angle and distance to the approached waypoing. The flight path and steering signal computer 75 of FIG. 13 provides the flight path reference signals generally in accordance with the following relationships for an ascent through transition altitude graphically illustrated in FIG. 11 (for descent the relationships are obviously similar):

(Pre) $H_D = H'_B - \tan \alpha_A (D_{TOTAL} - D_1 \pm Y_B)$ (Post) $H_D = H_B = \tan \alpha_B (D_{TOTAL} - D_1 \pm Y_B)$ where
 $H_D$ is the instantaneous desired altitude on the transition straight line flight path
 $\alpha_A$ and $\alpha_B$ are pre transition and post transition flight path angles respectively
 $H'_B$ is the apparent waypoint B altitude, i.e., referenced to baro altitude
 $H_B$ is the waypoint B altitude referenced to pressure altitude
 $D_{TOTAL}$ is the along track distance between waypoint A and waypoint B
 $D_1$ is the instantaneous craft distance from waypoint A
 $Y_B$ is any selected or programmed along track offset (FIG. 2).

Having thus computed the desired altitude $H_D$, the $H_D$ error or $\Delta H_D$ required for the generation of the steering signal is produced simply by comparing it with the actual altitude $H_{AC}$ of the aircraft. The $\Delta \dot{H}_D$ damping term is developed as explained above. Thus, the output of the steering computer of FIG. 13 is now acceptable to the aircraft autopilot and to the flight director horizontal pointer control. The $\Delta H_D$ signal, the craft deviation from the straight line flight path may be displayed on the glide slope pointer of the flight director indicator ADI, and/or horizontal situation indicator, HSI if desired.

With respect to the descent speed-reduction transition flight path of FIG. 15, from cruise altitude to a predetermined altitude at a predetermined waypoint, three distant straight line flight paths are computed. One is at a first angle $\Delta_B$ from a descent initiated waypoint at cruise altitude $H_A$ to a predetermined deceleration-initiate altitude $H_{DECEL}$ at a first distance ($D_{TOTAL} - D_A$) from the approached waypoint B; another flight path at a second angle $\alpha_T$ from $H_{DECEL}$ to the transition altitude $H_{TRANS}$ (typically 10,000 ft) at a second distance($D_{TOTAL} - D_{TRANS}$) from the approached waypoint during which speed is bled off such that at the transition altitude craft speed is a predetermined low value (typically 250 knots); and a third flight path at a third angle, which is equal to the first angle $\alpha_B$, to the waypoint B altitude $H_B$. The flight path and steering signal computations block 76 of FIG. 16 computes the aircraft deviation from each of these transition flight paths in the same manner as in FIG. 13 and the craft steering signal is also similarly computed. For example, the instantaneous desired altitude of the craft on the first descent flight path is determined in accordance with the general relationship:

$H_D = H_{DECEL} - \tan \alpha_B (D_A - D_1)$ where
 $H_{DECEL}$ is a predetermined altitude at which craft deceleration commences
 $\alpha_B$ is the angle of the first flight path sector
 $D_A$ is the distance from waypoint A to the transition altitude $H_{TRANS}$
 $D_1$ is the distance of the craft from waypoint A
Similarly the instantaneous desired altitude of the craft on the second and third flight path sectors is determined by the general relationships:

$H_D = H_{TRANS} - \tan \alpha_T (D_A + D_{TRANS} - D_1)$ where
 $\alpha_T$ is the angle of the second or deceleration flightpath sector
and $H_D = H_B - \tan \alpha_B (D_{TOTAL} - D_1)$ where
 $\alpha_B$ is the angle of the third flight path sector, and
 $D_{TOTAL}$ is the distance from the descent initiate waypoint A to the approached waypoint B.

Again, having computed the desired instantaneous altitude $H_D$ for the three flight path sectors, aircraft deviation therefrom is simply derived by comparing this desired altitude with the actual aircraft altitude $H_{AC}$. The steering signal $\theta_c$ is generated as above with respect to FIG. 13.

Having now generally discussed what may be thought of as the output section of the system of the present invention, a detailed discussion, primarily of the input section of the system, is set forth in the following.

Figure 4:
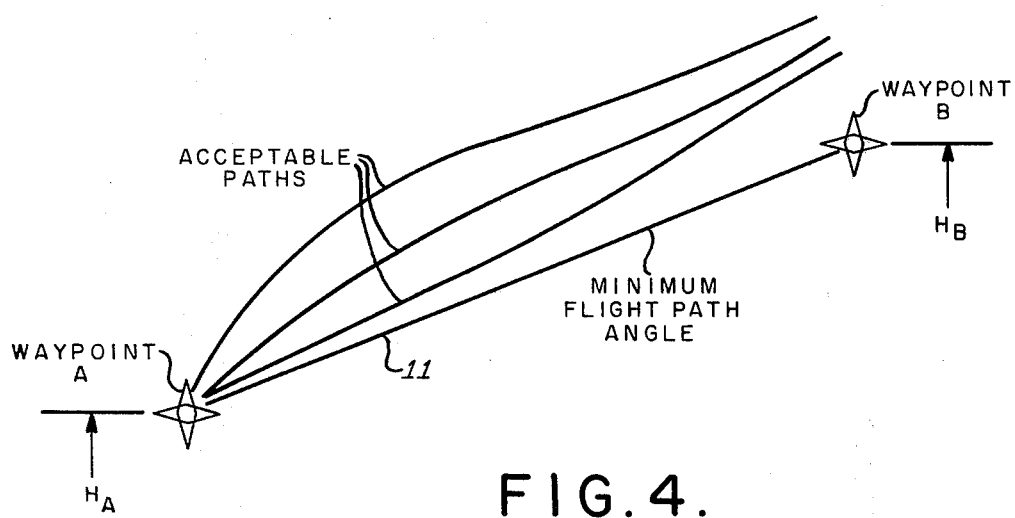
FIGS. 4, 5, 6 and 7 are vertical flight path diagrams illustrating flight paths flown in accordance with the present invention.
Figure 5:
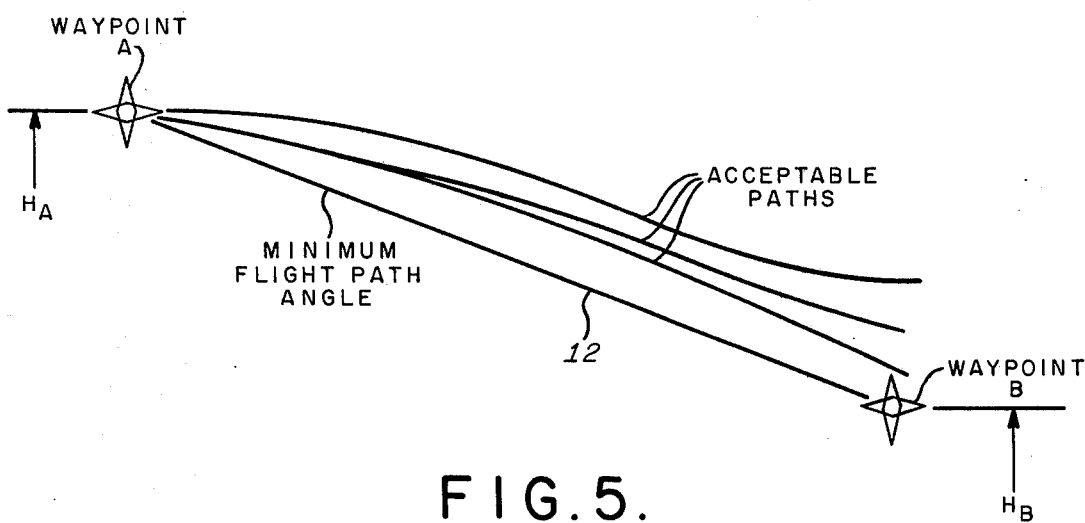
Figure 6:
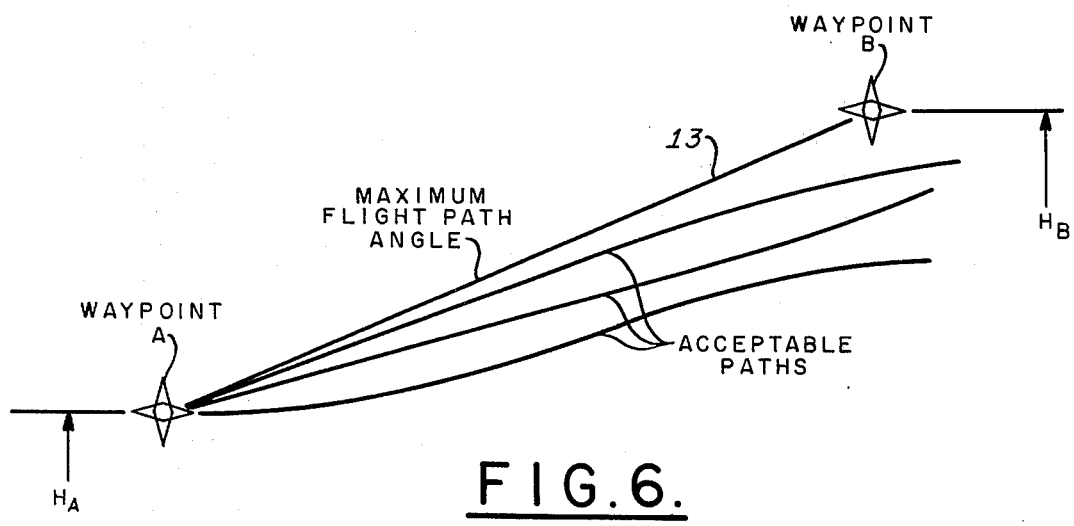
Figure 7:
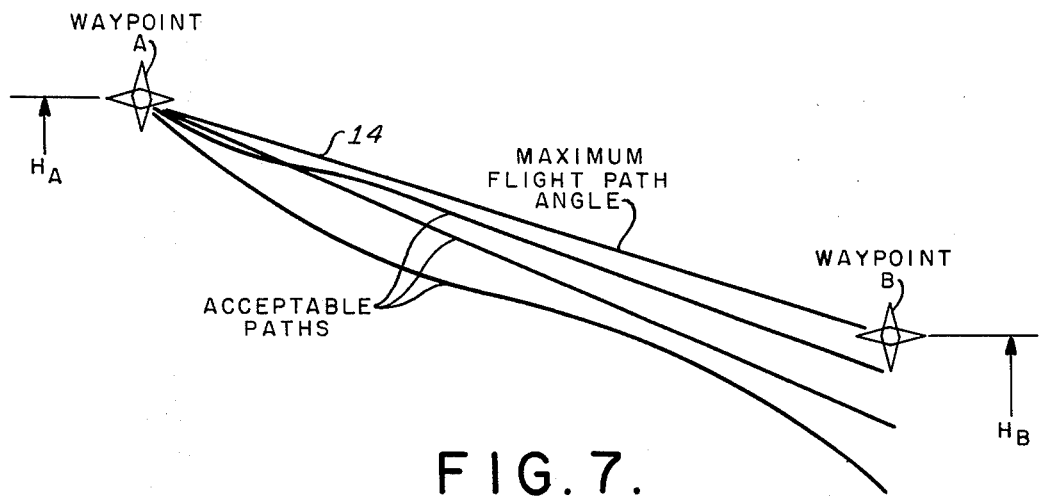

Referring to FIGS. 4, 5, 6 and 7, acceptable flight paths in accordance with the invention for at-or-above and at-or-below designated waypoints are illustrated. In FIG. 4 in which the aircraft ascends from the altitude $H_A$ of the waypoint A to at-or-above the altitude $H_B$ at the waypoint B, typical acceptable paths are illustrated which have flight path angles greater than the minimum flight path angle of the straight line path 11. It is appreciated that the flight path 11 represents the boundary of the acceptable flight paths for ascending to at-or-above the altitude $H_B$ of the waypoint B. Under the conditions illustrated in FIG. 4 the flight path 11 has a minimum boundary flight path angle associated therewith as well as a minimum boundary altitude rate. FIG. 5 illustrates a boundary flight path 12 as well as typical acceptable flight paths for descending from the altitude $H_A$ of the waypoint A to at-or-above the altitude $H_B$ of the waypoint B. It will be appreciated that the boundary flight path 12 has a minimum acceptable flight path angle and a minimum acceptable altitude rate associated therewith. FIG. 6 illustrates typical acceptable flight paths and a boundary flight path 13 for an aircraft ascending from the altitude $H_A$ at the waypoint A to at-or-below the altitude $H_B$ at the waypoint B. The boundary flight path 13 has a maximum flight path angle and a maximum altitude rate associated therewith. Similarly, FIG. 7 illustrates typical acceptable flight paths and a boundary flight path 14 for an aircraft descending from the altitude $H_A$ at the waypoint A to at-or-below the altitude $H_B$ at the waypoint B. The boundary flight path 14 has a maximum acceptable flight path angle and a maximum acceptable altitude rate associated therewith. It will be appreciated with respect to FIGS. 4, 5, 6 and 7 that the flight path angle and altitude rates discussed are signed quantities where ascending quantities are positive and descending quantities are negative. Thus, for example, in FIG. 5 the minimum flight path angle of the boundary flight path 12 is more negative than the flight path angles of the acceptable paths.

Figure 8:
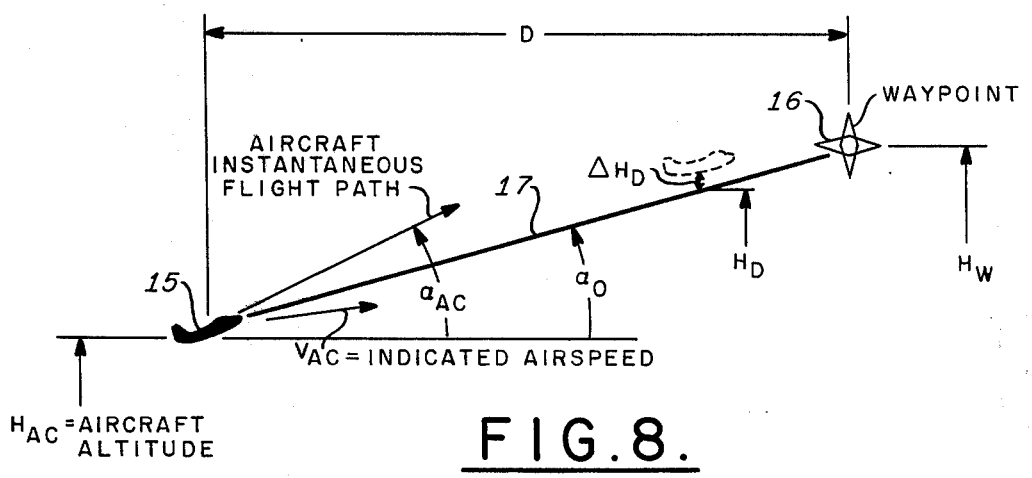
FIG. 8 is a vertical flight path diagram illustrating vertical navigation parameters in accordance with the present invention.

Referring now to FIG. 8, the vertical navigation parameters utilized in controlling an aircraft 15 on the desired flight path are illustrated. The aircraft 15 is depicted at an instantaneous altitude $H_{AC}$ with an indicated airspeed of $V_{AC}$ and approaching a waypoint 16 having an altitude of $H_W$. The straight line 17 from the aircraft 15 to the waypoint 16 constitutes the boundary of acceptable paths with a boundary flight path angle of $\alpha_0$. The aircraft 15 is illustrated at a lateral distance D from the waypoint 16 with an instantaneous flight path angle of $\alpha_{AC}$.

In accordance with the invention, the aircraft 15 is controlled to ascend or descend at a specified indicated airspeed (IAS) to a "soft" altitude at-or-above or at-or-below the waypoint altitude $H_W$. At-or-above defines the aircraft 15 crossing the waypoint 16 at a minimum altitude with any altitude above the minimum altitude acceptable. "At-or-below" denotes the aircraft 15 crossing the waypoint 16 at a maximum altitude with any altitude below the maximum altitude being acceptable. These soft altitude requirements are utilized with regard to the invention as compared to a "hard" altitude requirement where the aircraft 15 must cross the waypoint 16 "at" the altitude $H_W$. The optimum indicated airspeed for the maneuver ($V_{REF}$) may be selected manually by the pilot or automatically in a manner to be explained. The airspeed may alternatively be controlled to a Mach number with regard to a reference Mach number $M_{REF}$. The invention provides a pilot alert warning if the selected IAS and resulting flight path angle are not sufficient to meet the altitude requirements.

Referring now to FIG. 9, a schematic block diagram of apparatus for vertical flight path control in ascending or descending to waypoints with at-or-above or at-or-below altitude requirements in accordance with the invention is illustrated. The apparatus of FIG. 9 includes a plurality of function blocks that may be instrumented by any of a variety of well known devices. For example, the function blocks may be instrumented by special purpose discrete analog or digital circuits or may alternatively be implemented by general purpose digital or analog computation apparatus. The circuits of FIG. 9 may be instrumented in a manner similar to that described in co-pending U.S. patent application Ser. No. 581,987, filed May 29, 1975, in the names of William C. Post and Edmond E. Olive, entitled "Steered Lateral Course Transition Control for Aircraft Area Navigation System" or in co-pending U.S. patent application Ser. No. 581,988, filed May 29, 1975, in the names of Donald H. Baker, Larry J. Bowe and William C. Post, entitled "Helical Vertical Path Control For Aircraft Area Navigation System", both applications being assigned to the present assignee.

A conventional air data system 20 provides signals $V_{AC}$, $M_{AC}$, $H_{AC}$, TAS and $\dot{H}_{AC}$ representative of the aircraft indicated airspeed, the aircraft Mach number, the aircraft altitude, the aircraft true airspeed and the aircraft altitude rate respectively. The apparatus further includes a VOR receiver 21 for providing the VOR bearing $\Omega$ and a DME receiver 22 for providing the DME distance R in response to signals from a VORTAC as explained in said Ser. No. 582,987 and Ser. No. 581,988. The apparatus further includes a compass system 23 for providing aircraft heading HDG in a conventional manner.

The apparatus of FIG. 9 also includes a computer 24 for storing the navigational and waypoint associated data with respect to the flight plan of the aircraft. For example, the computer 24 may be preloaded prior to a particular flight with the geographical locations, associated altitudes and associated data of all of the waypoints along the flight plan as well as the locations of the associated VORTACs. The computer 24 is arranged in a conventional manner to provide the required data as the aircraft executes the flight plan with respect to the sequentially encountered waypoints.

The computer 24 receives signals from a pilot manual data input device 25 by which the pilot may alter the data stored in the computer 24 or may enter new data therein. The device 25 may, for example, be implemented as a conventional alphanumeric and discrete data keyboard entry device for providing the data to the computer 24 in a well known manner. The device 25 may be utilized, for example, when the pilot wishes to deviate from the flight plan as stored in the computer 24 or when the pilot wishes to alter specific values stored therein.

The computer 24 provides signals $V_{REV}$ and $M_{REF}$ representative of the reference indicated airspeed and the reference Mach number respectively. These quantities may be entered by the pilot via the device 25 of alternatively, may be initialized with respect to the current aircraft airspeed at the time the associated system mode is selected should the pilot fail to command a different speed. The computer 24 also provides a signal $M_O$ defining a boundary Mach number above which Mach is used and below which indicated airspeed is utilized for providing the steering commands in a manner to be described. $M_O$ is a prestored computer constant representative of the specific aircraft type in which the system is installed.

Since the optimum climb of the aircraft controlled by the apparatus of FIG. 9 is not to a fixed path, an altitude error is displayed in a manner to be described which is the difference between the aircraft altitude $H_{AC}$ from the air data system 20 and the first firm altitude specified for a subsequent waypoint in the flight plan. This firm altitude (not at-or-above or at-or-below) is the altitude to which the climb or descent is being flown. The first firm altitude is provided by the $H_{FIRM}$ signal from the computer 24. This capability is utilized, for example, when the aircraft climbs from a departure airport to cruise altitude along a flight path defined by a sequence of waypoints having altitudes at which the aircraft is required to cross at-or-above in its climb to the first waypoint at the cruise altitude.

The computer 24 also provides a signal on a line designated as W/P DATA representative of parameters associated with the waypoints of the flight plan. This stored waypoint data is specifically whether the waypoint is of the at-or-above or of the at-or-below variety and is represented in any convenient format by the W/P DATA signal on the associated line from the computer 24. The computer 24 also provides an $H_W$ signal representative of the altitude associated with each of the waypoints of the flight plan. The computer 24 further provides a $\psi_1$ signal representative of the lateral inbound course with respect to north of each of the waypoints of the flight plan. The parameter $\psi_1$ is well understood in the art and is explained in said Ser. No. 581,987 and Ser. No. 581,988. The computer 24 also provides signals designated as $\theta$ and $r$ representative of the bearing and distance respectively of each waypoint with respect to the associated VORTAC. These parameters are well understood in the art and are explained in detail in said Ser. No. 581,987 and Ser. No. 581,988. The computer 24 also provides the $Y_B$ signal as discussed above.

As previously described, the computer 24 may be preloaded prior to a particular flight with all of the data relating to the waypoints of the flight plan as well as the data relating to the aircraft characteristics. As previously discussed, the computer 24 is arranged in a conventional manner to provide the above discussed prestored data as the aircraft executes the flight plan with regard to the sequentially encountered waypoints. The above discussed parameters $V_{REF}$ and $M_{REF}$ may also be altered by the pilot via the data input device 25 in accordance with pilot preferences.

The $\theta$ and $r$ signals from the computer 24 as well as the $\Omega$ and R signals from the VOR and DME receivers 21 and 22 respectively, are applied to a function block 26 to provide the north and east coordinates NAW and EAW respectively of the aircraft with respect to the waypoint that the aircraft is approaching. The function block 26 performs a well known function $F_1$ for converting the aircraft, waypoint and VORTAC bearing and distance data to the NAW and EAW coordinates. The function $F_1$ may be implemented in the manner described in said Ser. No. 581,987 and Ser. No. 581,988. The VOR and DME data from the receivers 21 and 22 are also applied to a function block 27 wherein conventional circuitry implementing a function $F_2$ provides the ground speed $V_G$ of the aircraft. It will be appreciated that aircraft heading (HDG) from the compass system 23 and true airspeed (TAS) from the air data system 20 may be utlized as inputs to the function block 27 thereby generating a current and accurate value of the ground speed $V_G$. The function $F_2$ of the block 27 may be implemented as disclosed in U.S. patent application Ser. No. 465,228 filed Apr. 29, 1974 in the names of Donald H. Baker and Larry J. Bowe, entitled "Radio Navigation System" and assigned to the assignee of the present invention.

The NAW and EAW signals from the function block 26, as well as the $\psi_1$ signal from the computer 24 are applied to a function block 30. The function block 30 provides a signal D representative of the distance of the aircraft to the waypoint in accordance with a function $F_3$. The function block 30 provides the distance D based on the north and east coordinates of the aircraft with respect to the waypoint (NAW, EAW) and the inbound course $\psi_1$, in accordance with functional relationships that are well known in the RNAV art, and will not be further described herein for brevity. The distance parameter D is as illustrated in FIG. 8.

The distance signal D from the function block 30, the aircraft altitude signal $H_{AC}$ from the air data system 20 and the waypoint altitude signal $H_W$ from the computer 24 are applied to a function block 31 to generate an $\alpha_0$ signal representative of the vertical angle of the boundary flight path 17 (FIG. 8) in accordance with a function $F_4$ as follows:

$$F_4 = \alpha_0 = \tan^{-1} \frac{\Delta H}{D}$$

where $$\Delta H = H_W - H_{AC}.$$

It is appreciated that the function $F_4$ of the block 31 is readily instrumented by any of a variety of suitable and well known analog or digital circuits.

The aircraft computed ground speed $V_G$ and the aircraft altitude rate signal $\dot{H}_{AC}$ from the air data system 20 are applied to a function block 32 to generate an $\alpha_{AC}$ signal representative of the aircraft instantaneous flight path angle in accordance with a function $F_5$ as follows:

$$F_5 = \alpha_{AC} = \frac{\dot{H}_{AC}}{V_G}$$

where the altitude rate $$\dot{H}_{AC} \text{ is } \frac{dH_{AC}}{dt}$$

The waypoint altitude signal $H_W$ from the computer 24, the aircraft altitude signal $H_{AC}$ from the air data system 20, the distance signal D from the function block 30 and the ground speed signal $V_G$ from the function block 27 are applied to a function block 33 to generate a signal $\dot{H}_0$ representative of the altitude rate on the boundary flight path (i.e., flight path 17 of FIG. 8) in accordance with a function $F_6$ as follows:

$$F_6 = \dot{H}_0 = \frac{\Delta H \cdot V_G}{K - D}$$

where $\Delta H = H_W - H_{AC}$, $\dot{H}_0$ is in feet per minute, $\Delta H$ is in feet, $V_G$ is in knots, D is in nautical miles and K is set at 60 for the conditions described.

The $\alpha_{AC}$ signal representative of the actual flight path angle of the aircraft from the function block 32 and the $\alpha_0$ signal representative of the flight path angle of the boundary flight path from the function block 31 as well as the waypoint data signal from the computer 24 are applied to a compare block 34. The compare block 34 provides an output to a conventional pilot alert device 35 as well as an output on a lead 36 to enable conventional vertical steering. As previously discussed, the waypoint data signal from the computer 24 is representative of whether the waypoint is of the at-or-above or the at-or-below type. The compare block 34 is instrumented with conventional logic circuitry to actuate the pilot alert device 35 when $\alpha_{AC}$ is algebraically less than $\alpha_0$ and the waypoint is of the at-or-above variety. The compare block 34 further includes conventional logic circuitry for enabling the pilot alert device 35 when $\alpha_{AC}$ is algebraically greater than $\alpha_0$ and the waypoint is of the at-or-below variety. When the waypoint is neither an at-or-above or an at-or-below waypoint, the waypoint data signal from the computer 24 causes the logic circuitry of the compare block 34 to enable the conventional vertical steering of the aircraft via the lead 36 as illustrated in FIG. 9. It will be appreciated that the logic functions described are readily implemented with conventional combinational logic configurations. It will furthermore be appreciated from FIGS. 4, 5, 6 and 7 that when the aircraft is not making good an acceptable flight path, the compare circuitry of the block 34 will enable the pilot alert device 35 thereby alerting the pilot that corrective action is required.

In the present embodiment of the invention the block 34 compares the actual aircraft flight path angle $\alpha_{AC}$ with the boundary flight path angle $\alpha_0$ to provide a pilot alert. Alternatively, the block 34 may instead compare actual altitude rate $\dot{H}_{AC}$ from the air data system 20 with the boundary altitude rate $\dot{H}_0$ from the function block 33 to provide the pilot alert in a manner similar to that described with respect to the flight path angle comparison. For convenience, the boundary parameters $\alpha_0$ and $\dot{H}_0$ from the blocks 31 and 33 respectively are displayed to the pilot on a conventional display device 37.

The aircraft actual airspeed signal $V_{AC}$ from the air data system 20 and the reference airspeed signal $V_{REF}$ from the computer 24 are applied to a summing junction 40 to provide a $\Delta V$ signal representative of the difference therebetween. In a similar manner the aircraft Mach number signal $M_{AC}$ from the air data system 20 and the reference Mach number $M_{REF}$ from the computer 24 are applied to a summing junction 41 to provide a $\Delta M$ signal representative of the difference therebetween. The $\Delta V$ and $\Delta M$ signals are applied through respective gain blocks 42 and 43 to a selection block 44. The gain blocks 42 and 43 multiply the $\Delta V$ and $\Delta M$ signals by gain constants $G_1$ and $G_2$ respectively in accordance with the control authority desired. A compare block 45 receives inputs from the aircraft Mach number signal $M_{AC}$ from the air data system 20 and the prestored computer Mach constant $M_0$ from the computer 24 and controls the selection circuit 44 to connect the velocity signal to an output lead 46 when $M_{AC} < M_0$ and to connect the Mach number signal to the output lead 46 when $M_{AC} \geq M_0$.

Thus pitch steering commands $\theta_c$ proportional to speed error are applied via the lead 46 and suitable select matrix 48 to the pitch channel of an automatic flight control system (AFCS) 47 which controls the pitch attitude of the aircraft via the pitch attitude control surfaces 50. The pitch steering commands on the lead 46 are preferably or alternatively also applied to the aircraft flight director system 51 which controls the vertical steering or pitch command bar 52 of the attitude director indicator (ADI) of the flight director system. The flight director 51 includes conventional damping terms such as velocity rate or Mach rate and/or pitch attitude as taught in U.S. Pat. No. 2,613,352. Also, the select matrix 48 is controlled by the conventional steering logic signal on lead 36, as required to switch into the autopilot and/or flight director the conventional steering signal from the conventional steering computation 38 as illustrated. Thus, above a Mach number of $M_0$ the difference between actual Mach $M_{AC}$ and reference Mach $M_{REF}$ provides the vertical pitch steering signals whereas below $M_0$ the difference between actual indicated airspeed $V_{AC}$ and the reference indicated airspeed $V_{REF}$ is utlized to provide the steering signals. A typical value for $M_0$ for modern jet transports is 0.78 Mach. Typically the aircraft is controlled to achieve the desired speed $V_{REF}$ or $M_{REF}$ by commanding a pitch up attitude change when $\Delta V$ or $\Delta M$ is positive and a pitch down attitude change when $\Delta V$ or $\Delta M$ is negative. The commands are presented to the pilot through the flight director command bar 52 on the ADI or control is automatic via the AFCS 47. When the $\Delta V$ signal is utilized, a typical pitch authority for jet transports is:

PITCH COMMAND = 0.352 · $\Delta V$ where PITCH COMMAND is in degrees and $\Delta V$ is in feet per second. Thus it is appreciated that the constant $G_1$ of the gain block 42 is equal to 0.352 in this instance. In a similar manner when the aircraft is controlled to Mach number, then a typical pitch authority for jet transports is:

PITCH COMMAND = 215 · $\Delta M$ where the PITCH COMMAND is again in degrees. It will be appreciated therefore that the constant $G_2$ of the gain block 43 will be equal to 215 in this instance. Thus, as the aircraft ascends or descends to a waypoint with an at-or-above or at-or-belowaltitude designation, the pitch steering commands are generated proportional to speed error with regard to the selected airspeed $V_{REF}$ or the selected Mach number $M_{REF}$.

The aircraft altitude signal $H_{AC}$ from the air data system 20 and the $H_{FIRM}$ signal from the computer 24 are applied to a summing junction 53 to provide an altitude error signal representative of the difference therebetween. The altitude error signal is applied to the glide slope vertical deviation indicator 54 of the aircraft horizontal situation indicator (HSI) or of the ADI of the flight director system. Thus, it is appreciated that the altitude error is displayed to the pilot in much the same manner as glide slope deviation is displayed during an instrument landing approach. Since the optimum climb or descent as described hereinabove is not to a fixed path, the altitude error displayed is the difference between the aircraft altitude $H_{AC}$ and the first firm altitude $H_{FIRM}$ specified for a subsequent waypoint in the flight plan. This firm altitude is that to which the ascent or descent is being flown. It will be appreciated that for conventional steering as controlled by the lead 36 and the switching matrix 48, conventional deviation signals as discussed above are applied to the glide slope indicator 54 from the computer 38.

Figure 10:
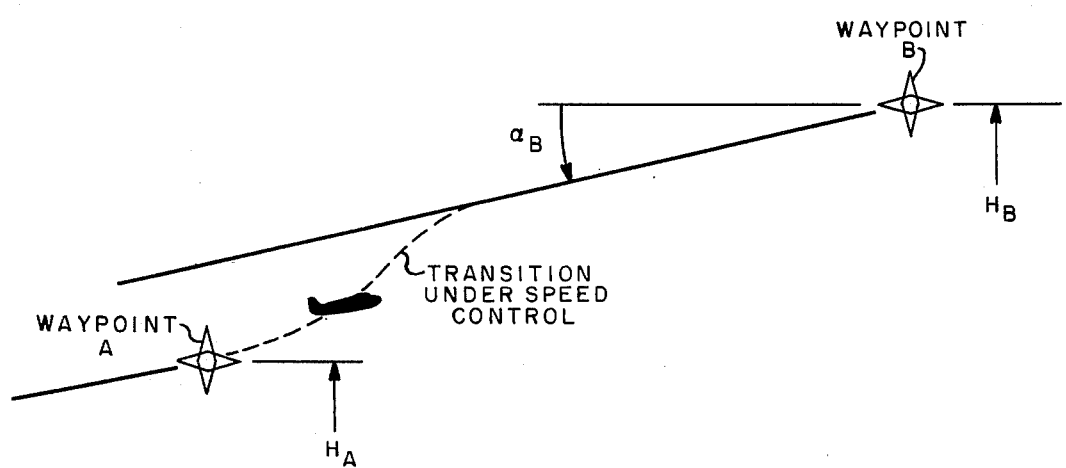
FIG. 10 is a vertical flight path diagram illustrating an alternative application of the present invention.

The capability of the apparatus of FIG. 9 to control the aircraft to a selected speed (IAS or Mach) may also be utilized by the RNAV system to transition between discontinuous flight paths. Referring to FIG. 10, a situation is illustrated where the selected altitude $H_B$ and the flight path angle $\alpha_B$ for waypoint B define a flight path that is not continuous with altitude $H_A$ at waypoint A. The discontinuity is flown under speed control as described hereinabove with the altitude error computed to the desired flight path to waypoint B. It is appreciated that other examples of discontinuities may be defined for ascents or descents and are flown in a similar manner.

As discussed hereinabove with respect to conventional RNAV systems, a flight path discontinuity is often experienced when the aircraft crosses the transition altitude below which the aircraft altitude is referenced to baro-corrected altitude (local baro setting) and above which the aircraft altitude is referenced to standard pressure altitude (29.92 baro setting) as the aircraft transitions between the waypoints of the flight plan. The present invention permits ascent and descent through the transition altitude by recomputing the flight path vertical angles with regard to the transition altitude crossing to provide continuous navigation without flight path discontinuities. As is known, the aircraft barometric altimeter is set with the local barometric pressure below the transition altitude and with the standard setting of 29.92 inches of mercury above the transition altitude. In U.S. domestic airspace the transition altitude is generally 18,000 feet. It will be appreciated that conventional air data systems typically provide pressure altitude data to the RNAV system at all times. When the aircraft is below the transition altitude this data is corrected to baro altitude in the pilot's altitude indicator or in the RNAV system in accordance with well known air data equations relating altitude correction to baro setting. For this purpose the local baro setting is provided as an input to the RNAV system from an external manually set device or through the pilot manual data input to the RNAV computer to permit the RNAV system to perform the altitude calculation.

Referring to FIG. 11, a vertical flight path diagram illustrates vertical navigation parameters with respect to ascending through the barometric to pressure altitude transition in accordance with the invention. The aircraft approaches a waypoint A defined at baro corrected altitude $H'_A$ and is to ascend through the transition altitude to a waypoint B defined at pressure altitude or flight level $H_B$. Since the waypoint A is below the transition altitude, the waypoint altitude $H'_A$ is conveniently stored in terms of thousands of feet. For example, if the waypoint A has an altitude $H'_A$ of 13,000 feet, then $H'_A$ will be stored as 13,000 feet. Since the waypoint B is above the transition altitude the waypoint altitude $H_B$ is conveniently stored as a flight level. For example, if the waypoint altitude $H_B$ is at a pressure altitude of 33,000 feet, then flight level 330 is stored as the $H_B$ altitude of the waypoint. In a manner to be described hereinafter, the RNAV system computes an apparent waypoint B at a baro corrected altitude $H'_B$ numerically equal to the pressure altitude $H_B$. For example, if $H_B$ is at flight level 330, then $H'_B$ is 33,000 feet. It will be appreciated that the apparent waypoint B will generally be physically displaced vertically from the waypoint B by the altitude correction for the specific baro setting and altitude.

The angle $\alpha_A$ is the vertical flight path angle which, if flown, would bring the aircraft to baro altitude $H'_B$ at apparent waypoint B. This is the path that the aircraft is constrained to fly below the transition altitude, the path terminating a distance $D_A$ from the waypoint A where the path intersects the transition altitude. $D_{TOTAL}$ is the lateral distance between the waypoint A and the waypoint B and DB is the difference between $D_{TOTAL}$ and $D_A$. The angle $\alpha_A$ is computed as follows:

$$\alpha_A = \tan^{-1} \frac{H'_B - H'_A}{D_{TOTAL}}$$

The distance $D_A$ is computed as follows:

$$D_A = \frac{H_{TRANS} - H'_A}{\tan \alpha_A}$$

Upon attaining the distance $D_A$ from the waypoint A, a new vertical angle $\alpha_B$ is computed based on the remaining distance $D_B$ to the waypoint B and the difference between the waypoint B pressure altitude $H_B$ and the pressure altitude $H'_{TRANS}$ equivalent to the transition altitude $H_{TRANS}$ as follows:

$$\alpha_B = \tan^{-1} \frac{H_B - H'_{TRANS}}{D_{TOTAL} - D_A}$$

The aircraft is controlled to the flight path defined by the vertical angles $\alpha_A$ and $\alpha_B$ as it flies from the waypoint A to the waypoint B.

Referring now to FIG. 12, a vertical flight path diagram illustrates identical navigation parameters with respect to descending through the pressure to barometric altitude transition in accordance with the invention. The aircraft approaches a waypoint A at a pressure altitude of $H_A$ and must descend to a waypoint B through the transition altitude attaining a baro corrected altitude $H'_B$. The path below the transition is determined by computing the flight path angle $\alpha_B$ for the apparent waypoint A at which the flight level $H_A$ is interpreted as a numerically equal baro altitude $H'_A$. $\alpha_B$ is computed as follows:

$$\alpha_B = \tan^{-1} \frac{H'_B - H'_A}{D_{TOTAL}}$$

where $D_{TOTAL} = D_A + D_B$ in the manner described with respect to FIG. 11. It is appreciated that the considerations with respect to flight level pressure altitude, baro altitude and transition altitude as well as the distances $D_A$ and $D_B$ discussed with regard to FIG. 11 also apply to the conditions of FIG. 12.

The point at which the flight path defined by $\alpha_B$ crosses the transition altitude is computed as follows:

$$D_A = \frac{H'_A - H_{TRANS}}{\tan \alpha_B}$$

The RNAV system then computes the angle $\alpha_A$ for the proper flight path for the aircraft to attain the transition altitude at the desired point defined by $D_A$. The angle $\alpha_A$ is computed from the pressure altitude $H'_{TRANS}$ equivalent to the transition altitude, the pressure altitude $H_A$ of the waypoint A and the distance $D_A$ as follows:

$$\alpha_A = \tan^{-1} \frac{H'_{TRANS} - H_A}{D_A}$$

The angle $\alpha_A$ is flown from the waypoint A until the aircraft reaches the point $D_A$ from the waypoint A and subsequently the angle $\alpha_B$ is flown to attain the waypoint B at the baro corrected altitude $H'_B$.

Referring now to FIG. 13, in which like reference numerals indicate like components with respect to FIG. 9, a schematic block diagram illustrating apparatus for effecting the vertical flight path control in accordance with FIGS. 11 and 12 when ascending or descending through the transition altitude is illustrated. The apparatus of FIG. 13 includes a plurality of function blocks that may be instrumented in a manner similar to that described above with respect to FIG. 9. The apparatus of FIG. 13 also includes the computer 24 as well as the pilot manual data input device 25 described above with respect to FIG. 9. The computer 24 provides a plurality of signals representing prestored data for executing the flight paths of FIGS. 11 and 12 which data may be manually altered by the pilot via the device 25. The computer 24 provides a signal $H_A$ representative of the altitude of the waypoint A as indicated in FIGS. 11 and 12. $H_A$ is a prestored quantity of the flight plan and is conveniently stored in terms of pressure altitude (flight level) when the altitude of the waypoint A is above the transition altitude or in terms of baro corrected altitude in feet when the altitude of the waypoint A is below the transition altitude. For example, if the waypoint altitude is stored in terms of flight level and the altitude of the waypoint is 33,000 feet, flight level 330 is stored as the quantity $H_A$. If, however, the waypoint altitude is stored as a barometrically corrected quantity in feet and, for example, has an altitude of 13,000 feet, the number 13,000 is stored as the quantity $H_A$. The computer 24 also provides a signal $H_B$ representative of the altitude of the waypoint B as illustrated in FIGS. 11 and 12. The quantity $H_B$ is stored in the computer 24 in a manner similar to that described for the quantity $H_A$ in accordance with the altitude of waypoint B being above or below the transition altitude. The computer 24 also provides a signal $H_{TRANS}$ representative of the transition altitude as discussed above with respect to FIGS. 11 and 12. This quantity is conveniently stored as barometrically corrected altitude in feet. As discussed above, in domestic U.S. airspace $H_{TRANS}$ is 18,000 feet.

The computer 24 further provides a signal $D_{TOTAL}$ representative of the prestored distance between the waypoints A and B as illustrated in FIGS. 11 and 12. The computer 24 additionally provides signals $\psi_1$, $\theta$ and $r$ representative respectively of the inbound course to the waypoint, the bearing of the waypoint with respect to the associated VORTAC and the range of the waypoint with respect to the associated VORTAC in a manner similar to that described above with respect to FIG. 9. It will be appreciated that with respect to the flight paths of FIGS. 11 and 12, the $\psi_1$, $\theta$ and $r$ quantities are provided with respect to the waypoint B, i.e., the waypoint to which the aircraft is on an inbound course. The computer 24 also provides the $Y_B$ signal as described above.

The apparatus of FIG. 13 additionally includes the VOR receiver 21 and the DME receiver 22 as discussed above with respect to FIG. 9. The VOR receiver 21 provides the signal $\Omega$ and the DME receiver 22 provides the signal R representative respectively of the bearing and range of the aircraft with respect to the VORTAC to which the receivers 21 and 22 are automatically tuned by the flight plan program.

In a manner similar to that described above with respect to FIG. 9, the $\theta$ and $r$ signals from the computer 24 as well as the $\Omega$ and R signals from the VOR and DME receivers 21 and 22 respectively are applied to the function block 26 to provide the north and east coordinates NAW and EAW respectively of the aircraft with respect to waypoint B that the aircraft is approaching. Again, in a manner similar to that described above with respect to FIG. 9, the NAW and EAW signals from the function block 26 as well as the $\psi_1$ signals from the computer 24 are applied to the function block 30 that provides a signal representative of the distance of the aircraft to the waypoint B being approached. The output from the function block 30 and the $D_{TOTAL}$ signal from the computer 24 are applied to a summing junction 55 to provide a $D_1$ signal representative of the distance of the aircraft from the waypoint A. This is appreciated from the flight path geometry illustrated in FIGS. 11 and 12.

The apparatus of FIG. 13 includes a baro set block 56 for providing the local baro correction to the RNAV system. The baro set device 56 may be a manually adjustable potentiometer or the baro correction may be entered into the computer 24 via the pilot manual data input device 25. The baro correction from the device 56 and the $H_{TRANS}$ signal from the computer 24 are applied to a summing junction 57 that provides an $H'_{TRANS}$ signal representative of the pressure altitude of the transition altitude (FIGS. 11 and 12) equivalent to the $H_{TRANS}$ value in baro altitude. Generally the numerical value of $H_{TRANS}$ will not be equal to that of $H'_{TRANS}$ except when the local barometric pressure is the standard 29.92 inches of mercury. It will be appreciated that if the components 56 and 57 are not utilized and the baro correction is entered into the computer 24 via the device 25, the computer 24 will calculate the provide the value of $H'_{TRANS}$ utilizing conventional air data equations relating altitude correction to the baro setting.

The $H_A$ signal, the $H_B$ signal and the $D_{TOTAL}$ signal are applied to a function block 60 to generate an $\alpha_A$ signal representative of the flight path angle $\alpha_A$ of FIG. 11 in accordance with a function $F_7$ as follows:

$$F_7 = \alpha_A = \tan^{-1} \frac{H'_B - H'_A}{D_{TOTAL}}$$

It will be appreciated, as discussed above, that $H_B$ and $H'_B$ as well as $H_A$ and $H'_A$ have numerically equal values with respect to each other. The unprimed quantities represent waypoint altitudes above the transition altitudes expressed as pressure altitude or flight level. The primed quantities represent waypoint altitudes below the transition altitude expressed as barometrically corrected altitude.

The $\alpha_A$ signal from the function block 60 as well as the $H_{TRANS}$ and $H_A$ signal from the computer 24 are applied to a function block 61 to generate a $D_A$ signal representative of the distance $D_A$ of FIG. 11 in accordance with a function $F_8$ as follows:

$$F_8 = D_A = \frac{H_{TRANS} - H'_A}{\tan \alpha_A}$$

The $D_A$ signal from the function block 61, the $H'_{TRANS}$ signal from the summing junction 57 as well as the $H_B$ and $D_{TOTAL}$ signals from the computer 24 are applied to a function block 62 to generate an $\alpha_B$ signal representative of the flight path angle $\alpha_B$ of FIG. 11 in accordance with a function $F_9$ as follows:

$$F_9 = \alpha_B = \tan^{-1} \frac{H_B - H'_{TRANS}}{D_{TOTAL} - D_A}$$

The $H_A$, $H_B$ and $D_{TOTAL}$ signals from the computer 24 are applied to a function block 63 to generate an $\alpha_B$ signal representative of the flight path $\alpha_B$ of FIG. 12 in accordance with a function $F_{10}$ as follows:

$$F_{10} = \alpha_B = \tan^{-1} \frac{H'_B - H'_A}{D_{TOTAL}}$$

The $\alpha_B$ signal from the function block 63 as well as the $H_A$ and $H_{TRANS}$ signals from the computer 24 are applied to a function block 64 to generate a $D_A$ signal representative of the distance $D_A$ of FIG. 12 in accordance with a function $F_{11}$ as follows:

$$F_{11} = D_A = \frac{H'_A - H_{TRANS}}{\tan \alpha_B}$$

The $D_A$ signal from the function block 64, the $H'_{TRANS}$ signal from the summing junction 57 and the $H_A$ signal from the computer 24 are applied to a function block 65 to generate an $\alpha_A$ signal representative of the flight path angle $\alpha_A$ of FIG. 12 in accordance with a function $F_{12}$ as follows:

$$F_{12} = \alpha_A = \tan^{-1} \frac{H'_{TRANS} - H_A}{D_A}$$

The waypoint altitude signal $H_A$ and the transition altitude signal $H_{TRANS}$ from the computer 24 are applied to a compare block 66 wherein conventional comparison circuits provide an output when the numerical value of $H_A$ in feet is less than the altitude in feet of $H_{TRANS}$, i.e., the altitude of the waypoint A is below the transition altitude. The $H_A$ and $H_{TRANS}$ signals from the computer 24 are also applied as inputs to a compare block 67 wherein conventional circuits provide an output when the altitude of the waypoint A is above the transition altitude. In a similar manner the $H_B$ signal and the $H_{TRANS}$ signal from the computer 24 are applied to a compare block 70 wherein conventional circuits provide an output when the altitude of the waypoint B is above the transition altitude. It will be appreciated that each of the outputs of the compare circuits 66, 67 and 70 is a binary valued signal in accordance with whether or not the associated comparison is satisfied. It will also be appreciated with regard to the compare circuits 66 and 67 that when one of the circuits is providing a binary one, the other circuit must be providing a binary zero because of the mutually exclusive comparisons performed thereby.

The outputs from the compare circuits 66, 67 and 70 as well as the $D_A$ signals from the function blocks 61 and 64 are applied to selection logic 71. The selection logic 71 comprises conventional circuitry for selecting the $D_A$ signal from either the block 61 or from the block 64 and applying the selected signal to its output in accordance with the binary states of the compare circuits 66, 67 and 70. When $H'_B$ is greater than $H_{TRANS}$ and $H'_A$ is less than $H_{TRANS}$, the $D_A$ signal from the function block 61 is routed to the output of the select circuit 71. These are the conditions illustrated in FIG. 11 and thus it is appreciated that the aircraft is ascending from the waypoint A to the waypoint B through the transition altitude. Therefore, the value of $D_A$ as illustrated in FIG. 11 and provided by the function block 61 is utilized.

When $H'_B$ is not greater than $H_{TRANS}$ and $H'_A$ is greater than $H_{TRANS}$, the $D_A$ signal from the function block 64 is selected and routed to the output of the select circuit 71. These are the conditions illustrated in FIG. 12 and thus it is appreciated that the aircraft is descending from the waypoint A to the waypoint B through the transition altitude. Therefore, the value of $D_A$ as illustrated in FIG. 12 and provided by the function block 64 is utilized. The selected $D_A$ signal from the selection block 71 and the $D_1$ signal from the summing junction 55 are applied to a comparison circuit 72 that provides a binary output signal in accordance with $D_1$ being greater than or equal to $D_A$.

The binary output signals from the compare blocks 66, 67, 70 and 72 are applied as selection inputs to a selection matrix 73. The $\alpha_A$ signals from the function blocks 60 and 65 as well as the $\alpha_B$ signals from the function blocks 62 and 63 are applied as inputs to the selection matrix 73. A signal representative of the normal vertical angle utilized when the aircraft is not either ascending or descending through the transition altitude is applied to the selection matrix 73 via a lead 74. The selection matrix 73 selectively connects one of the inputs from the elements 60, 62, 63, 65 and 74 in accordance with the binary states of the comparison circuits 66, 67, 70 and 72. With reference to FIG. 11, when the aircraft is ascending through the transition altitude from the waypoint A to the waypoint B, $H'_B$ is greater than $H_{TRANS}$, and $H'_A$ is less than $H_{TRANS}$. Thus as discussed above, the $D_A$ value from the function block 61 is applied to the comparator 72 via the selection circuit 71. When the distance $D_1$ of the aircraft from the waypoint A is not greater than or equal to $D_A$ and the comparisons between $H'_A$ and $H'_B$ with respect to $H_{TRANS}$ is as discussed with respect to the ascending situation of FIG. 11, the selection matrix 73 connects the $\alpha_A$ signal from the function block 60 to the output 46 where it is employed for the computation of the flight path deviation and steering signals as discussed above. Since, as discussed above, the function block 60 is utilized to compute the value of $\alpha_A$ as illustrated in FIG. 11, this angle will be controlling under the conditions specificed. If, however, $D_1$ is greater than or equal to $D_A$ during the ascending situation of FIG. 11, the selection matrix 73 connects the $\alpha_B$ signal from the function block 62 to the output 46 so that the $\alpha_B$ flight path angle illustrated in FIG. 11 will be the controlling flight path angle reference.

Under the conditions of FIG. 12 when the aircraft is descending through the transition altitude, $H'_B$ is not greater than $H_{TRANS}$ and $H'_A$ is greater than $H_{TRANS}$. Under these conditions when the distance $D_1$ from the waypoint A is not greater than or equal to $D_A$ the $\alpha_A$ signal from the function block 65 is connected to the output 46 of the selection matrix 73. When, however, $D_1$ is greater than or equal to $D_A$ the $\alpha_B$ signal from the function block 63 is connected to the output 46 of the selection matrix 73 in accordance with the conditions illustrated in FIG. 12.

When, however, $H'_B$ is greater than $H_{TRANS}$ and $H'_A$ is not less than $H_{TRANS}$ the aircraft is flying between two waypoints above the transition altitude and thus the normal vertical angle signal on the line 74 is connected to the output 46 of the selection matrix 73. Conversely, when $H'_B$ is not greater than $H_{TRANS}$ and $H'_A$ is not greater than $H_{TRANS}$, the aircraft is flying between two waypoints below the transition altitude and again the normal vertical angle signal on the lead 74 is connected to the output 46 of the selection matrix 73.

In a manner similar to that described above with regard to FIG. 9, the output 46 is connected to the flight path and steering signal computer 75, the output $\theta_c$ of which is applied to the automatic flight control system 47 for automatically controlling the aircraft in accordance with the selected signals $\alpha_A$ and $\alpha_B$ via the pitch control surfaces 50. The output $\theta_c$ is also applied to the flight director 51 which controls the vertical steering pointer 52 of the ADI. The actual deviation of the craft from the path defined by $\alpha_A$ or $\alpha_b$ may also be applied to the glide slope indicator 54 on the HSI or the ADI to provide an indication to the pilot with respect to deviations of the aircraft above or below the selected flight paths illustrated in FIGS. 11 and 12 as defined by the flight path angles $\alpha_A$ and $\alpha_B$. Thus it is appreciated that the apparatus of FIG. 13 computes the vertical flight path angles $\alpha_A$ or $\alpha_B$ which permit smooth flight through the baro transition altitude $H_{TRANS}$.

Large jet transport aircraft typically descend from the enroute altitude at a specified Mach or IAS. Air traffic regulations require that the enroute speed must be reduced so as not to exceed a maximum value $V_{MAX}$ by the time the aircraft attains a transition altitude $H_{TRANS}$. For example, in domestic U.S. airspace the transition altitude is 10,000 feet and $V_{MAX}$ is 250 knots indicated airspeed. Modern jet transports cannot always achieve the required speed reduction by merely reducing thrust. Generally a minimum thrust is required to maintain cabin pressurization. Generally the aircraft deceleration begins at 14,000 feet to achieve the 250 knots IAS at 10,000 feet as required. The altitude of 14,000 feet is selected since it is the highest altitude where idle power can be utilized without loss of cabin pressurization. Since a minimum thrust is required to maintain cabin pressurization, in the prior art the pilot usually reduced rate of descent until the speed was sufficiently attenuated.

Figure 14:
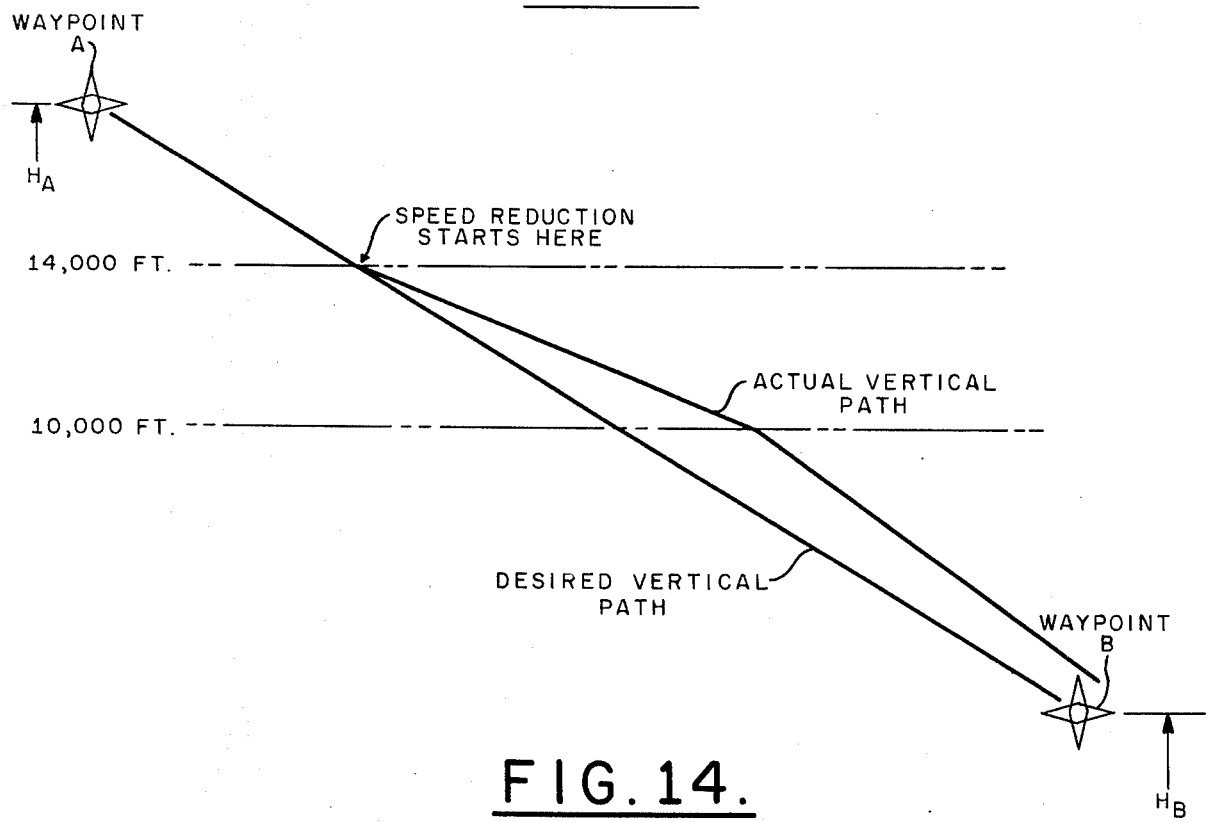
FIG. 14 is a vertical flight path diagram illustrating a conventional flight path utilized in reducing airspeed during a descent.

Referring now to FIG. 14, a vertical flight path diagram of a conventional flight path utilized in reducing airspeed during a descent illustrates how the above described prior art maneuver affects the vertical performance. The aircraft descending from a waypoint A at altitude $H_A$ to a waypoint B at altitude $H_B$ at a constant flight path angle so as to fly point-to-point along a straight line vertical flight path, reduces the rate of descent at 14,000 feet by executing a pitch up maneuver such that at 10,000 feet the IAS has been sufficiently reduced. It is appreciated from FIG. 14 that by the time the aircraft decelerates to the required IAS a significant altitude error is developed which the aircraft may not be capable of reducing to zero by the time the waypoint B is reached. As previously discussed, it is appreciated that the pilot must disconnect the AFCS from the RNAV system in order to perform this maneuver.

Referring now to FIG. 15, the vertical geometry for effecting the speed reduction in accordance with the invention is illustrated. A transition zone of length $D_{TRANS}$ is provided between a selected altitude $H_{DECEL}$ (typically the 14,000 feet altitude described above) and the transition altitude $H_{trans}$ (typically the 10,000 foot altitude as required) in which a shallow angle $\alpha_T$ is commanded to permit the aircraft to decelerate from its current airspeed $V_{AC}$ to the desired SPEED $V_{MAX}$. In accordance with the invention the RNAV system computes the descent vertical angle $\alpha_B$ that permits the deceleration to be executed at the shallower transition angle $\alpha_T$ prior to reaching the transition altitude $H_{TRANS}$. After decelerating in the transition zone the descent flight path angle $\alpha_B$ is resumed so that the aircraft crosses the waypoint B at the altitude $H_B$.

In order to compute the required vertical angles, the RNAV system first computes the distance $D_{TRANS}$ required for the transition as follows:

$$t = \frac{V_{AC} - V_{MAX}}{a}$$

where $t$ is the time required to decelerate from $V_{AC}$ to $V_{MAX}$ and $a$ is the desired transition deceleration rate.

Typical jet transports decelerate at 2 ft/sec$^2$. Thus if $V_{AC}$ and $V_{MAX}$ are in feet per second the above equation becomes $$t = \tfrac{1}{2}(V_{AC} - V_{MAX}) \text{ seconds}$$

The transition distance is then given by $$D_{TRANS} = V_{AC}t - \frac{at^2}{2}$$

This equation reduces to the following for the typical deceleration rate of 2 ft/sec$^2$.

$$D_{TRANS} = \frac{V_{AC} + V_{MAX}}{2} t$$
$$= \frac{V_{AC}^2 - V_{MAX}^2}{4}$$

The vertical angles for the descent are then computed as follows:

$$\alpha_T = \tan^{-1} \frac{H_{DECEL} - H_{TRANS}}{D_{TRANS}}$$

$$\alpha_B = \tan^{-1} \frac{H_B - H_A + H_{DECEL} - H_{TRANS}}{D_{TOTAL} - D_{TRANS}}$$

The distance $D_A$ as illustrated in FIG. 15 is computed as follows:

$$D_A = \frac{H_{DECEL} - H_A}{\tan \alpha_B}$$

Referring now to FIG. 16 in which like reference numerals indicate like components with respect to FIGS. 9 and 13, a schematic block diagram illustrating apparatus for effecting the vertical flight path control as illustrated in FIG. 15 when descending from the waypoint A to the waypoint B through the speed reduction transition altitude is illustrated. The apparatus of FIG. 16 includes a plurality of function blocks that may be instrumented in a manner similar to that described above with respect to FIGS. 9 and 13. The apparatus of FIG. 16 includes the air data system 20 that provides the $V_{AC}$ signal representative of the indicated airspeed of the aircraft as well as the $H_{AC}$ and $\dot{H}_{AC}$ signal in the manner described above with respect to FIG. 9. The apparatus of FIG. 16 also includes the computer 24 as well as the pilot manual data input device 25 described above with respect to FIGS. 9 and 13. The computer 24 provides a plurality of signals representing prestored data for executing the flight path of FIG. 15, which data may be manually altered by the pilot via the device 25.

The computer 24 provides a signal $V_{MAX}$ representing the maximum speed below the speed reduction transition altitude. In domestic U.S. airspace $V_{MAX}$ is required to be 250 knots IAS. The computer 24 also provides a signal $H_{TRANS}$ representative of the transition altitude illustrated in FIG. 15. As discussed, this quantity is normally the constant value of 10,000 feet. The computer 24 further provides an aircraft performance parameter $H_{DECEL}$ representative of the altitude typically utilized to begin the deceleration. As discussed above, this altitude is typically selected as 14,000 feet. The computer 24 further provides waypoint parameter signals $D_{TOTAL}$, $H_B$ and $H_A$ representative of the prestored distance between the waypoints A and B, the altitude of the waypoint B and the altitude of the waypoint A respectively as illustrated in FIG. 15. The signals $D_{TOTAL}$, $H_B$ and $H_A$ were discussed hereinabove with respect to FIG. 13 as provided by the computer 24 and are additionally utilized in the apparatus of FIG. 16. In a manner similar to that described above with respect to FIG. 13, the computer 24 provides the signals $\psi_1$, $\theta$ and $r$ representative respectively of the inbound course to the waypoint, the bearing of the waypoint with respect to the associated VORTAC and the range of the waypoint with respect to the associated VORTAC. It will be appreciated that with respect to the flight path of FIG. 15 the $\psi_1$, $\theta$ and $r$ quantities are provided with respect to the waypoint B, i.e., the waypoint to which the aircraft is on an inbound course. The computer 24 also provides the $Y_B$ signal as discussed above.

The apparatus of FIG. 16 additionally includes the VOR receiver 21 and the DME receiver 22 as discussed above with respect to FIGS. 9 and 13. The VOR receiver 21 provides the signal $\Omega$ and the DME receiver 22 provides the signal R representative respectively of the bearing and range of the aircraft with respect to the VORTAC to which the receivers 21 and 22 are tuned.

In a manner similar to that described above with respect to FIG. 13, the $\theta$ and $r$ signals from the computer 24 as well as the $\Omega$ and R signals from the VOR and DME receivers 21 and 22 respectively are applied to the function block 26 to provide the north and east coordinates NAW and EAW respectively of the aircraft with respect to waypoint B that the aircraft is approaching. Again in a manner similar to that described above with respect to FIG. 13, the NAW and EAW signals from the function block 26 as well as the $\psi_1$ from the computer 24 are applied to the function block 30 that provides the signal representative of the distance of the aircraft to the waypoint B being approached. Again as illustrated in FIG. 13 and described with respect thereto, the output from the function block 30 and the $D_{TOTAL}$ signal from the computer 24 are applied to the summing junction 55 to provide the $D_1$ signal representative of the distance of the aircraft from the waypoint A.

The $V_{AC}$ signal from the air data system 20 and the $V_{MAX}$ signal from the computer 24 are applied to a function block 80 to generate a $D_{TRANS}$ signal representative of the transition distance illustrated in FIG. 15 in accordance with a function $F_{13}$ as follows:

$$F_{13} = D_{TRANS} = \frac{V_{AC}^2 - V_{MAX}^2}{4}$$

The $D_{TRANS}$ signal from the function block 80 as well as the $H_{TRANS}$ and $H_{DECEL}$ signals from the computer 24 are applied to a function block 81 to generate an $\alpha_T$ signal representative of the transition zone flight path angle $\alpha_T$ as illustrated in FIG. 15 in accordance with a function $F_5$ as follows:

$$F_{14} = \alpha_T = \tan^{-1} \frac{H_{DECEL} - H_{TRANS}}{D_{TRANS}}$$

The $D_{TRANS}$ signal from the function block 80 as well as the $H_{TRANS}$, $H_{DECEL}$, $D_{TOTAL}$, $H_B$ and $H_A$ signals from the computer 24 are applied to a function block 82 to generate an $\alpha_B$ signal representative of the flight path angle $\alpha_B$ illustrated in FIG. 15 in accordance with a function $F_{15}$ as follows:

$$F_{15} = \alpha_B = \tan^{-1} \frac{H_B - H_A + H_{DECEL} - H_{TRANS}}{D_{TOTAL} - D_{TRANS}}$$

The $\alpha_B$ from the function block 82 as well as the $H_{DECEL}$ and $H_A$ signals from the computer 24 are applied to a function block 83 to generate a $D_A$ signal representative of the distance $D_A$ illustrated in FIG. 15 in accordance with a function $F_{16}$ as follows:

$$F_{16} = D_A = \frac{H_{DECEL} - H_A}{\tan \alpha_B}$$

The $D_1$ signal representative of the distance of the aircraft from the waypoint A as provided by the summing junction 55 and the $D_A$ signal from the function block 83 are applied to a compare block 84 wherein conventional comparison circuits provide an output when $D_1$ is less than $D_A$. The $D_{TRANS}$ signal from the function block 80 and the $D_A$ signal from the function block 83 are applied as inputs to a summing junction 85 that provides a signal representative of the sum $D_A + D_{TRANS}$. The $D_1$ output of the summing junction 55 and the $D_A + D_{TRANS}$ output of the summing junction 85 are applied to a compare block 86 wherein conventional circuits provide an output when $D_1$ is less than $D_A + D_{TRANS}$. It will be appreciated that each of the outputs of the compare circuits 84 and 86 is a binary valued signal in accordance with whether or not the associated comparison is satisifed.

The outputs from the compare circuit 84 and 86 as well as the $\alpha_T$ signal from the function block 81 and the $\alpha_B$ signal from the function block 82 are applied to a selection matrix 87. The selection matrix 87 comprises conventional circuitry for selecting either the $\alpha_T$ signal from the function block 81 or the $\alpha_B$ signal from the function block 82 and applying the selected signal to the output 46 in accordance with the binary states of the compare circuits 84 and 86. When $D_1$ is less than $D_A$ or when $D_1$ is not less than $D_A + D_{TRANS}$, the $\alpha_B$ signal is connected to the output 46 of the selection matrix 87. When $D_1$ is not less than $D_A$ but is less than $D_A + D_{TRANS}$, the signal $\alpha_T$ is connected to the output 46 of the selection matrix 87. From the geometry of FIG. 15 it is appreciated that in accordance with the logic described the appropriate flight path angles will be utilized to control the associated legs of the flight path illustrated.

The flight path angle signals $\alpha_T$ and $\alpha_B$ are selected by the selection matrix 87 on the basis of the distance $D_1$ from the waypoint A. Alternatively, these angles may be selected in accordance with the aircraft altitude with respect to the quantities $H_{TRANS}$ and $H_{DECEL}$ from the computer 24. In such an embodiment the air data system 20 provides the signal $H_{AC}$ representative of the aircraft altitude. In such an alternative embodiment $\alpha_B$ is selected when $H_{AC}$ is less than $H_{TRANS}$ or $H_{AC}$ is greater than $H_{DECEL}$. The angle $\alpha_T$ is selected when $H_{TRANS}$ is less than $H_{AC}$ and $H_{AC}$ is less than $H_{DECEL}$.

In a manner similar to that described above with regard to FIGS. 9 and 13, the output 46 is connected to the flight path and steering signal computation arrangements 76 for controlling the automatic flight control system 47 for automatically controlling the aircraft flight path in accordance with the selected flight path angle signals $\alpha_B$ and $\alpha_T$ via the pitch control surfaces 50. The output of the steering signal computer 76 is also applied to the flight director 51 which controls the vertical steering pointer 52 of the ADI. The actual deviation of the craft from the path defined by $\alpha_B$ and $\alpha_T$ may also be applied to the glide slope indicator 54 on the HSI or the ADI to provide an indication to the pilot with respect to deviations of the aircraft above or below the selected flight path illustrated in FIG. 15 as defined by the flight path angles $\alpha_B$ and $\alpha_T$.

Thus it is appreciated that the apparatus of FIG. 16 is utilized to control the aircraft in accordance with the computed flight path illustrated in FIG. 15 as defined by the flight path angles $\alpha_B$ and $\alpha_T$. The computer 24 provides the air traffic control requirement $V_{MAX}$ and the air data system 20 provide the speed $V_{AC}$ utilized in determining the extend of the speed change required to achieve $V_{MAX}$. The quantity $D_1$ (distance of the aircraft from waypoint A) is computed for determining when the deceleration should occur. When the aircraft attains the distance $D_A$ from the waypoint A of FIG. 15 at which point the selection matrix 87 switches from the flight path angle $\alpha_B$ to the flight path angle $\alpha_T$, the automatic flight control system 47 automatically pitches the aircraft up or the pilot manually executes a pitch up maneuver in response to the command from the pitch command bar 52; deviation monitoring being continuously provided by the glide slope indicator 54. At this point the pilot controls the throttles and utilizes the aircraft airspeed indicator for controlling the speed in the transition zone to effect the required deceleration which for modern jet transports is 2 ft/sec$^2$. The pilot controls the aircraft speed in this manner while maintaining the pitch command bar on the ADI or the glide slope indicator centered to make good the $\alpha_B$ and $\alpha_T$ flight path angle commands.

It will thus be appreciated that the RNAV system predicts the distance $D_{TRANS}$ that is required to slow the aircraft from its speed on the first segment of the flight path illustrated in FIG. 15 to the speed $V_{MAX}$ on the last segment of the illustrated flight path. The system then computes the angle $\alpha_B$ and $\alpha_T$ as discussed above permitting the aircraft to descend without having to deviate from the illustrated prescribed flight path with the vertical deviation on the HSI remaining centered and the AFCS remaining coupled to the RNAV system. Thus the required speed reduction is attained with the system providing continuous guidance.

Figure 17:
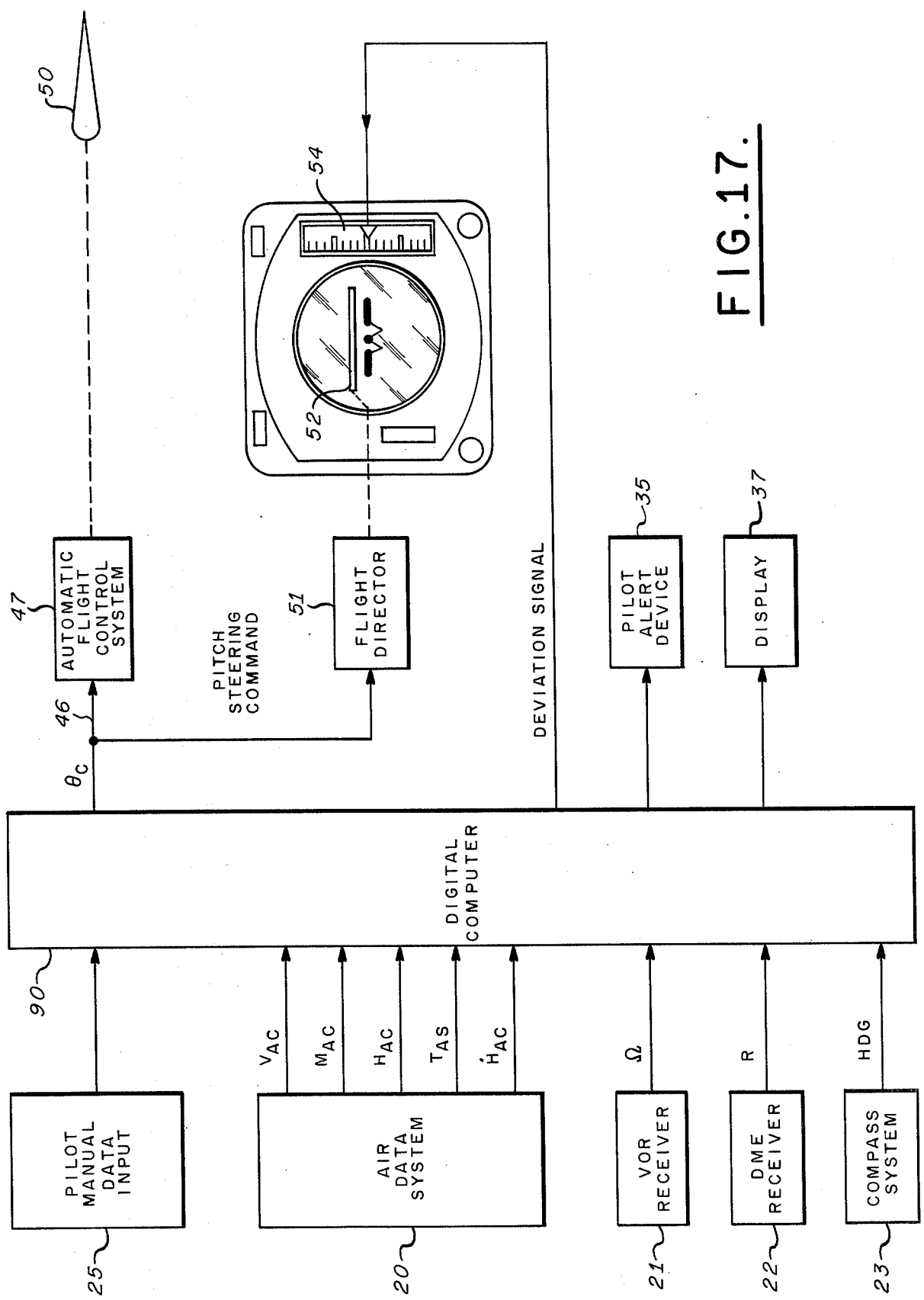
FIG. 17 is a schematic block diagram of an alternative embodiment of the invention.

Referring now to FIG. 17 in which like reference numeral indicates like components with respect to FIGS. 9, 13 and 16, an alternative embodiment of the invention is illustrated. The air data system 20, the VOR receiver 21, the DME receiver 22, the compass system 23 and the pilot manual data input device 25 provide inputs to a programmed general purpose digital computer 90, the data inputs from the blocks 20, 21, 22, 23 and 25 being similar to those described above with respect to FIGS. 9, 13 and 16. It will be appreciated that conventional analog-to-digital converters (not shown) may be utilized at the input interface of the computer 90 where appropriate. The computer 90 is programmed to provide the pitch steering command signal $\theta_c$ to the AFCS 47 for controlling the pitch control surfaces 50 as well as to the flight director system 51 for providing the pitch command to the pitch command vertical steering bar 52 of the ADI. The digital computer 90 is also programmed to provide flight path deviation signals to the glide slope indicator 54 of the HSI or the ADI as well as signals to the pilot alert device 35, and to the display 37. The computer 90 also effects conventional vertical steering where required as described above. The nature and purpose of the output signals from the computer 90 have been previously described with respect to FIGS. 9, 13 and 16. It will be appreciated that the digital values of these output signals are converted by conventional digital to analog devices (not shown) to provide associated analog signals where appropriate.

The computer 90 is programmed in a conventional and well known manner to provide the NAW and EAW signals as described above from the VOR and DME data. The computer 90 is also programmed in a conventional manner to provide the ground speed $V_G$ signal from the VOR, DME, heading and true air speed data in a manner similar to that described above. Additionally, in a manner hereinabove described with regard to the computer 24 of FIGS. 9, 13 and 16, the computer 90 stores the $V_{REF}$, $M_{REF}$, $M_O$, $H_{FIRM}$, W/P data, $H_W$, $\psi_1$, $\theta$, $r$, $Y_B$, $H_A$, $H_{TRANS}$, $H_B$, $D_{TOTAL}$ and $H_{DECEL}$ data with regard to the VORTACs and waypoints of the flight plan. These data may also be altered an supplemented by the pilot manual data input device 25 in the manner previously described.

Figure 18:
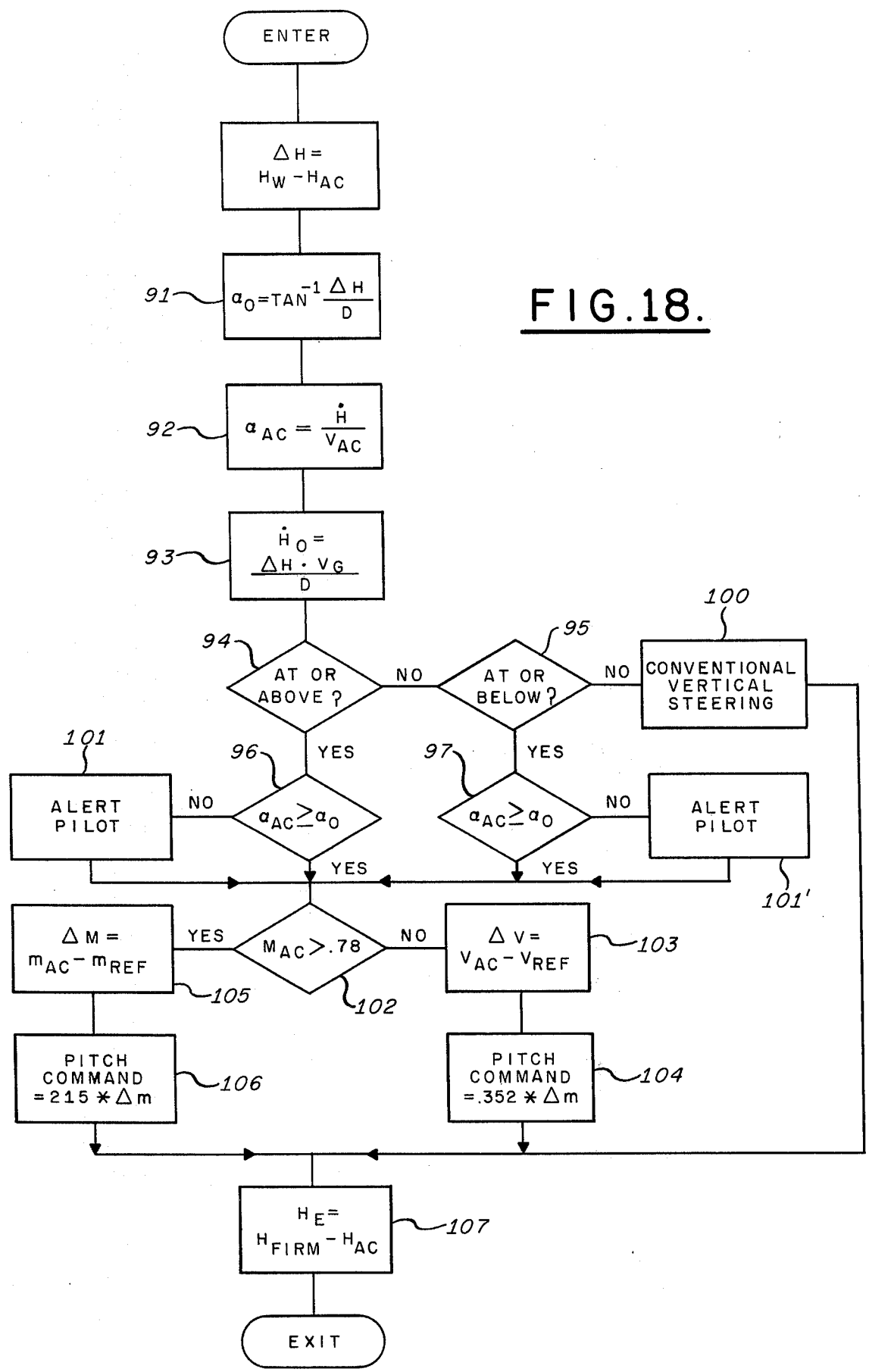
FIG. 18 is a program flow diagram of the computations performed by the embodiments of FIG. 17 for controlling the vertical steering of the aircraft when ascending or descending to a waypoint with an at-or-above or at-or-below altitude requirement.
Figure 19:
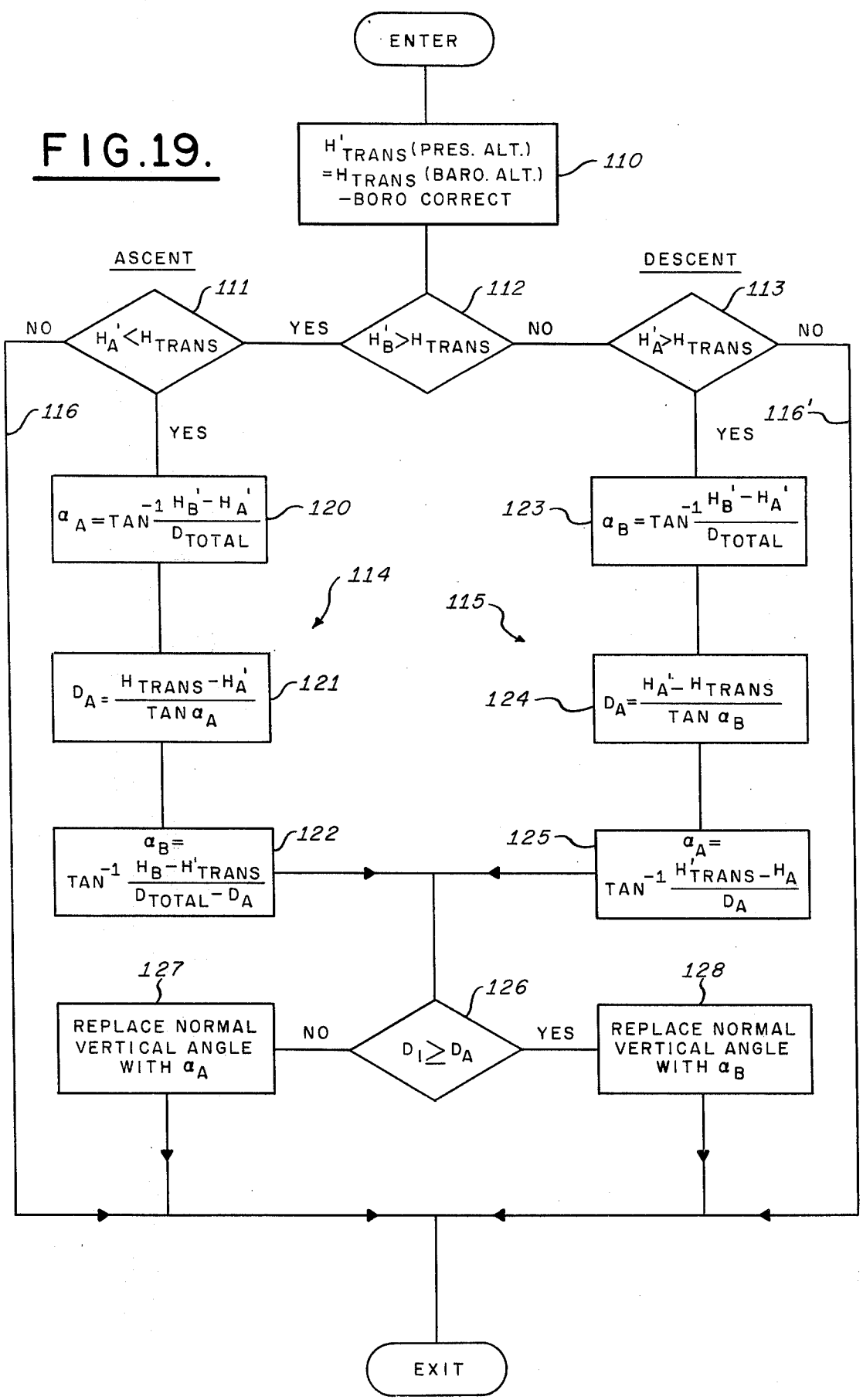
FIG. 19 is a program flow diagram of the computations performed by the embodiment of FIG. 17 for providing the vertical path control when the aircraft is ascending or descending through the pressure-barometric altitude transition.
Figure 20:
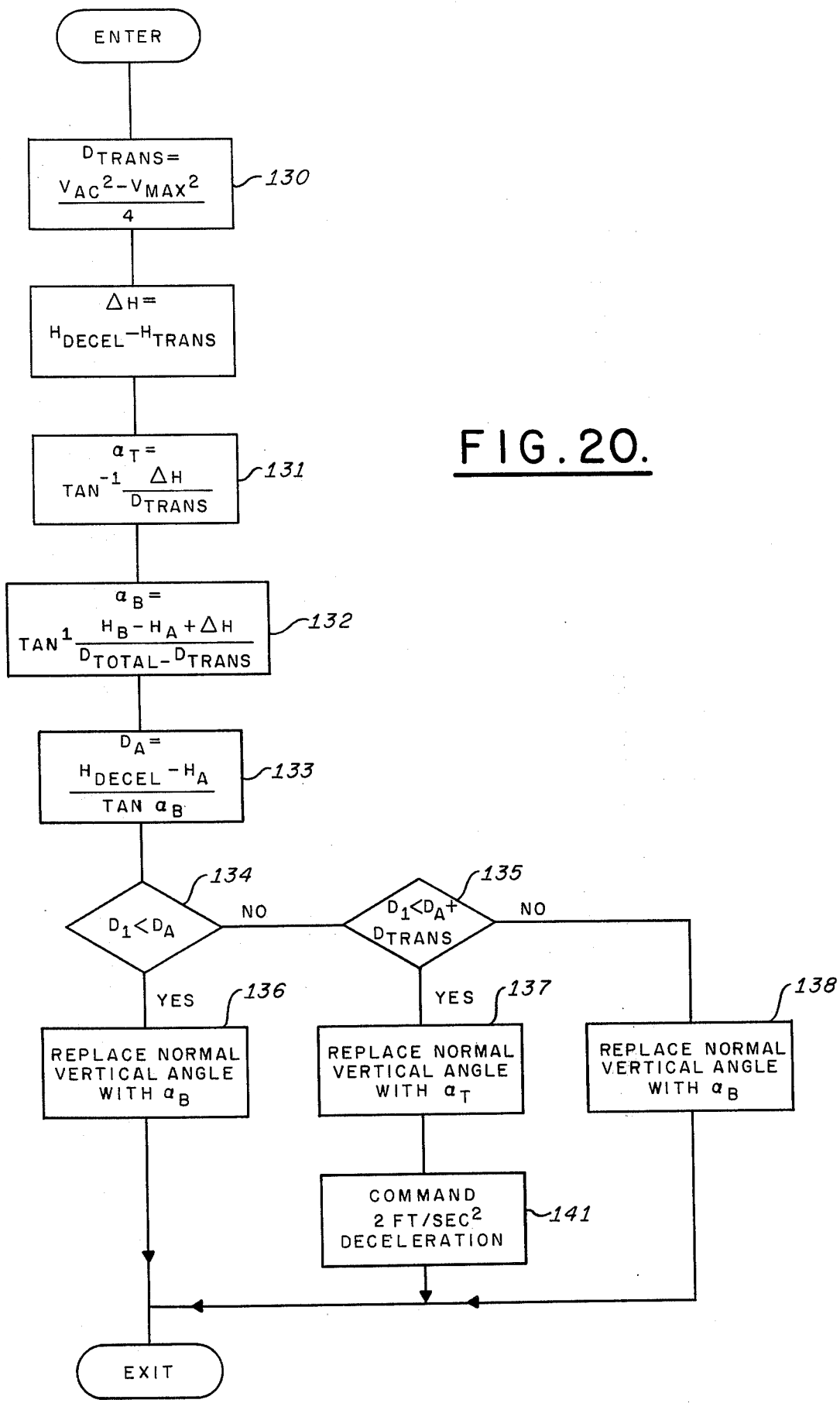
FIG. 20 is a program flow diagram of the computations performed by the embodiments of FIG. 17 for providing the vertical path control for permitting the aircraft to decelerate during a descent.

With the above described parameters internally available, the computer 90 is programmed to provide the above described output signals in accordance with the program flow charts of FIGS. 18, 19 and 20. It will be readily appreciated by those skilled in the art that coding is generated in a routine manner from the flow charts of FIGS. 18, 19 and 20, in any convenient programming language associated with the computer utilized.

Referring now to FIG. 18, the program flow chart for the computations discussed above with respect to FIGS. 4–10 is illustrated. The parameters $\alpha_O$, $\alpha_{AC}$ and $H_O$ are computed as illustrated in blocks 91, 92 and 93 of the flow chart of FIG. 18 in a manner similar to that described above with respect to functions $F_4$, $F_5$, and $F_6$ respectively. Decision blocks 94 and 95 determine if the waypoint being approached has an at-or-above or an at-or-below altitude designation. In accordance with the decision made at the blocks 94 and 95 the program then either algebraically compares the aircraft flight path angle $\alpha_{AC}$ with the boundary flight path angle $\alpha_O$ in blocks 96 and 97 or provides conventional vertical steering via block 100. If the aircraft is not on an acceptable path in accordance with FIGS. 4–7, the pilot is appropriately alerted in any convenient manner via blocks 101 and 101' after which the program flows to a decision block 102. The decision block 102 determines whether Mach number of indicated airspeed should be utilized in generating the pitch steering command, blocks 103 and 104 providing the command in accordance with airspeed and blocks 105 and 106 providing the command in accordance with Mach number. The pitch command from either the block 104 or 106 selected in accordance with the decision made in the block 102 is applied to the AFCS 47 and to the flight director 51 as described above. The program then enters a block 107 wherein the altitude error signal $H_E$ is generated for application to the glide slope indicator 54 as explained above. After execution of the block 107 the program exits and is thereafter repeatedly reiterated by return to the entry point indicated.

Referring now to FIG. 19, the program flow chart illustrating the computations discussed above with respect to FIGS. 11, 12 and 13 is illustrated. The transition altitude $H_{TRANS}$ expressed in barometrically corrected terms is converted to pressure altitude $H'_{TRANS}$ in block 110. The program then flows into decision blocks 111, 112 and 113 wherein decisions are made to determine firstly if the transition altitude is traversed and secondly if the aircraft is ascending or descending through the transition altitude. If the aircraft is ascending through the transition altitude a program path 114 is taken and if the aircraft is descending through the transition altitude a path 115 is followed. If, however, the aircraft does not cross the transition altitude in flying from the waypoint A to the waypoint B (FIGS. 11 and 12), path 116 or 116' is followed by the program flow.

On the program path 114 the parameters $\alpha_A$, $D_A$ and $\alpha_B$ are computed as indicated in blocks 120, 121 and 122 respectively in a manner similar to that described above with respect to the functions $F_7$, $F_8$ and $F_9$ respectively of FIG. 13. When the program selects the path 115 the parameters $\alpha_B$, $D_A$ and $\alpha_A$ are computed as illustrated in block 123, 124 and 125 respectively in a manner similar to that described above with respect to the functions $F_{10}$, $F_{11}$ and $F_{12}$ respectively of FIG. 13. The program progresses from the paths 114 and 115 into a decision block 126 wherein the aircraft distance $D_1$ from the waypoint A (FIGS. 11 and 12) is compared with the parameter $D_A$ to determine which of the flight path angles $\alpha_A$ or $\alpha_B$ should be utilized to provide the vertical steering signal. In accordance with the aircraft location $D_1$, the program enters either a block 127 or 128 to provide the computed and selected flight path angle $\alpha_A$ or $\alpha_B$ as the flight path reference for the vertical steering signal $\theta_c$ to the automatic flight control system 47 and the flight director 51 as well as for the deviation signals to the glide slope indicator 54 as discussed above. If the path 116 or 116' is selected by the program flow, the normal vertical angle is utilized since these paths bypass the computation paths 114 and 115 for the pressure-barometric altitude transition. Irrespective of which of the paths 114, 115, 116 or 116' is followed by the program, the program flow exits as indicated and subsequently returns to the entry point for repeated iterations of the program.

Referring now to FIG. 20, the program flow chart for the computations discussed above with respect to FIGS. 15 and 16 are illustrated. The parameters $D_{TRANS}$, $\alpha_T$, $\alpha_B$ and $D_A$ are computed as illustrated in blocks 130, 131, 132 and 133 respectively of the flow chart of FIG. 20 in a manner similar to that described above with respect to functions $F_{13}$, $F_{14}$, $F_{15}$ and $F_{16}$ respectively. Decision blocks 134 and 135 determine the distance $D_1$ of the aircraft from the waypoint A of FIG. 15 with respect to the flight path illustrated in the figure. In accordance with the flight path segment on which the aircraft is flying, the vertical angle $\alpha_B$ or $\alpha_T$ is selected as the flight path reference for the vertical steering signal $\theta_c$ for application to the automatic flight control system 47 and the flight director 51 as well as for the deviation signals to the glide slope indicator 54 for controlling the aircraft in accordance therewith as indicated in blocks 136, 137 and 138 respectively. When the aircraft is flying the transition segment in accordance with the block 137 the pilot commands the necessary deceleration to achieve $V_{MAX}$ at the transition altitude in accordance with block 141. The deceleration may be commanded manually whereby the pilot controls the throttles to appropriately reduce the airspeed. The throttles may also be controlled automatically in systems so equipped. The program exits from the blocks 136, 138 and 141 at the block indicated by the legend and the program flow subsequently returns to the entry point for repeated iterations of the program.

It is thus appreciated from the foregoing that the invention provides vertical navigation in which the aircraft is controlled to meet the demands of the special procedures described above. The at-or-above and the at-or-below procedures are performed by executing the altitude transition at a constant preselected airspeed. This permits the aircraft to climb or descend at an optimum rate for the power setting selected by the pilot. Control is selectively to Mach number or airspeed. Transitions through the altitude at which the altitude reference baro setting is changed between local baro and 29.92 inches of mercury is performed by the angle computations described above which provide smooth vertical paths without large altitude errors at the transition altitude and eliminate flight path discontinuities. As described above, a deceleration zone is computed so as to compensate the vertical angle on descent paths to permit deceleration to terminal area speeds without the requirement for additional waypoints.

Thus it is appreciated that optimum operational performance is obtained while reducing the pilot work load under the conditions of the vertical navigation tasks discussed above. Smooth and continuous navigation is provided under the above described conditions without the necessity of disconnecting the automatic flight control system from the RNAV system. The above described techniques are consistent with the procedures utilized by the pilot when flying the aircraft manually.

While the invention has been described in its preferred embodiments, it is to be understood that the words which have been used are words of description rather than limitation and that changes may be made within the purview of the appended claims without departing from the true scope and spirit of the invention in its broader aspects.

We claim:
1. In an area navigation system for aircraft, apparatus for controlling the vertical flight path of the aircraft when ascending or descending to a waypoint having an altitude and an at-or-above or an at-or-below altitude requirement associated therewith comprising vertical steering signal generating means for generating a vertical steering signal representative of deviations of the airspeed of said aircraft from a reference airspeed, pitch axis control means responsive to said vertical steering signal for controlling the pitch attitude of said aircraft so as to reduce said speed deviations to zero, boundary parameter computing means for providing a boundary parameter signal representative of the value of a suitable aircraft parameter on a boundary flight path defined by a straight line from the instantaneous location of said aircraft to said waypoint at said altitude thereof, aircraft parameter computing means of providing an aircraft parameter signal representative of the instantaneous actual value of said aircraft parameter, means for providing a waypoint data signal representative of said at-or-above or said at-or-below designation of said waypoint, comparator means responsive to said boundary parameter signal, said aircraft parameter signal and said waypoint data signal for comparing said aircraft parameter signal to said boundary parameter signal in accordance with said waypoint data signal and providing a pilot alert signal when said actual value of said aircraft parameter relative to said boundary value thereof indicates an actual aircraft flight path tending to violate said at-or-above or said at-or-below altitude requirement of said waypoint, and pilot alert means responsive to said pilot alert signal for providing a warning that said aircraft is tending to violate said at-or-above or said at-or-below altitude requirement.

2. The apparatus of claim 1 in which said boundary parameter computing means comprises boundary flight path angle computing means for providing a boundary flight path angle signal representative of the value of the flight path angle of said boundary flight path, said aircraft parameter computing means comprises aircraft flight path angle computing means for providing an aircraft flight path angle signal representative of the instantaneous value of the flight path angle of said aircraft, said comparator means comprises means responsive to said boundary flight path angle signal, said aircraft flight path angle signal and said waypoint data signal for comparing said aircraft flight path angle signal to said boundary flight path angle signal in accordance with said waypoint data signal and providing said pilot alert signal when said waypoint data signal designates an at-or-above waypoint and said aircraft flight path angle is less than said boundary flight path angle or when said waypoint data signal designates an at-or-below waypoint and said aircraft flight path angle is greater than said boundary flight path angle.

3. The apparatus of claim 2 further including means for providing a waypoint altitude signal representative of said altitude of said waypoint, means for providing an aircraft altitude signal representative of the actual altitude of said aircraft, means for providing a ground speed signal representative of the ground speed of said aircraft, and means for providing an altitude rate signal representative of the altitude rate of said aircraft.

4. The apparatus of claim 3 further including distance computing means for providing a distance signal representative of the distance of said aircraft from said waypoint.

5. The apparatus of claim 4 in which said boundary flight path angle computing means comprises means for providing said boundary flight path angle signal in accordance with a function of said waypoint altitude signal, said aircraft altitude signal and said distance signal.

6. The apparatus of claim 5 in which said boundary flight path angle computing means comprises means for computing the function $$\alpha_o = \tan^{-1} \frac{H_W - H_{AC}}{D}$$

where $\alpha_o$ = said boundary flight path angle signal
$H_W$ = said waypoint altitude signal
$H_{AC}$ = said aircraft altitude signal
$D$ = said distance signal.

7. The apparatus of claim 4 in which said aircraft flight path angle computing means comprises means for providing said aircraft flight path angle signal in accordance with a function of said altitude rate signal and said ground speed signal.

8. The apparatus of claim 7 in which said aircraft flight path angle computing means comprises means for computing the function $$\alpha_{AC} = \frac{\dot{H}}{V_G}$$

where $\alpha_{AC}$ = said aircraft flight path angle signal
$\dot{H}$ = said altitude rate signal
$V_G$ = said ground speed signal.

9. The apparatus of claim 1 further including altitude error computing means for generating an altitude error signal representative of the difference between the first firm altitude of a subsequent waypoint in the flight plan of said aircraft and the altitude of said aircraft, and vertical deviation indicator means responsive to said altitude error signal for providing a visual indication of said difference.

10. The apparatus of claim 1 in which said vertical steering signal generating means comprises means for providing an actual airspeed signal representative of the actual airspeed of said aircraft, means for providing an actual mach number signal repesentative of the actual mach number of said aircraft, means for providing a reference airspeed signal representative of a reference airspeed, means for providing a reference mach number signal representative of a reference mach number, means for providing a constant mach number signal representative of a predetermined constant mach number, a first summing junction responsive to said actual and reference airspeed signals for providing an airspeed difference signal representative of the difference therebetween, a second summing junction responsive to said actual and reference mach number signals for providing a mach number difference signal representative of the difference therebetween, comparator means responsive to said actual and constant mach number signals for providing a comparator output signal in accordance with said actual mach number signal exceeding said constant mach number signal, and selection means responsive to said airspeed difference signal, said mach number difference signal and said comparator output signal for providing said mach number difference signal as said vertical steering signal when said actual mach number signal exceeds said constant mach number signal and for providing said airspeed difference signal as said vertical steering signal when said actual mach number signal does not exceed said constant mach number signal.

11. The apparatus of claim 1 in which said pitch axis control means includes an automatic flight control system responsive to said vertical steering signal for controlling said aircraft about the pitch axis thereof so as to reduce said speed deviation to zero.

12. The apparatus of claim 1 in which said pitch axis control means includes a flight director system responsive to said vertical steering signal and including an attitude director indicator with the vertical steering cue thereof driven by said vertical steering signal.

13. In the area navigation system of claim 1, apparatus for controlling the vertical flight path of the aircraft when ascending or descending from a first waypoint to a second waypoint through the transition altitude at which the aircraft reference is changed from barometrically corrected altitude to pressure altitude in ascending flight and from pressure altitude to barometrically corrected altitude in descending flight, the altitude of the waypoint above said transition altitude being designated as pressure altitude and the altitude of the waypoint below said transition altitude being designated as barometrically corrected altitude, comprising first flight path angle computing means for providing a first flight path angle signal representative of a first flight path angle for a first straight line flight path from said first to said second waypoint at said altitudes designated therefor, second flight path angle computing means for providing a second flight path angle signal representative of a second flight path angle for a second straight line flight path from the point of intersection of said first flight path with said transition altitude to said second waypoint altitude at said altitude designated therefor for ascending flight and to said first waypoint altitude at said altitude designated therefor for descending flight, selection means responsive to said first and second flight path angle signals for selecting said first flight path angle signal when said aircraft is below said transition altitude and said second flight path angle signal when said aircraft is above said transition altitude, first further vertical steering signal generating means responsive to said selected flight path angle signal for providing a first further vertical steering signal in accordance with deviations from said straight line flight path defined by said selected flight path angle signal, and said pitch axis control means being responsive to said first further vertical steering signal for controlling the pitch attitude of said aircraft in accordance therewith.

14. In the area navigation system of claim 13, apparatus for controlling the vertical flight path of the aircraft when descending from a third waypoint to a fourth waypoint through the transition altitude below which the airspeed should be reduced to at most a maximum airspeed, said third and fourth waypoints having respective altitudes associated therewith, comprising transition distance computing means for providing a transition distance signal representative of a transition distance over which the airspeed is reduced from a first airspeed to said maximum airspeed, the deceleration beginning at a predetermined deceleration altitude, transition fight path angle computing means responsive to said transition distance signal for providing a transition flight path angle signal representative of a transition flight path angle for a straight line transition flight path from said deceleration altitude in accordance with said transition distance signal, descent flight path angle computing means for providing a descent flight path angle signal representative of a descent flight path angle for a first straight line descent flight path segment from said third waypoint at said altitude thereof to the point of intersection of said transition flight path with said deceleration altitude and for a second straight line descent flight path segment from the point of intersection of said transition flight path with said transition altitude to said fourth waypoint at said altitude therefor, further selection means responsive to said transition and descent flight path angle signals for selecting said descent flight path angle signal when said aircraft is above said deceleration altitude or below said transition altitude and said transition flight path angle signal when said aircraft is between said deceleration and transition altitudes, and second further vertical steering signal generating means responsive to said selected flight path angle signal for providing a second further vertical steering signal in accordance with deviations from said straight line flight path defined by said selected flight path angle signal, said pitch axis control means being responsive to said second further vertical steering signal for controlling the pitch attitude of said aircraft in accordance therewith, the throttles of said aircraft being controlled to effect deceleration on said transition flight path to at most said maximum airspeed.

15. In an area navigation system for aircraft, apparatus for controlling the vertical flight path of the aircraft when ascending from a first waypoint to a second waypoint through the transition altitude at which the aircraft altitude reference is changed from barometrically corrected altitude to pressure altitude, the altitude of said first waypoint being designated as barometrically corrected altitude and the altitude of said second waypoint being designated as pressure altitude, comprising first flight path angle computing means for providing a first flight path angle signal representative of a first flight path angle for a first straight line flight path from said first to said second waypoint at said altitudes designated therefor, second flight path angle computing means for providing a second flight path angle signal representative of a second flight path angle for a second straight line flight path from the point of intersection of said first flight path with said transition altitude to said second waypoint at said altitude designated therefor, selection means responsive to said first and second flight path angle signals for selecting said first flight path angle signal when said aircraft is below said transition altitude and said second flight path angle signal when said aircraft is above said transition altitude, vertical steering signal generating means responsive to said selected flight path angle signal for providing a vertical steering signal in accordance with deviations from said straight line flight path defined by said selected flight path angle signal, and pitch axis control means responsive to said vertical steering signal for controlling the pitch attitude of said aircraft in accordance therewith.

16. The apparatus of claim 16 in which said selection means comprises first distance computing means for providing a first distance signal representative of the lateral distance between said first waypoint and said point of intersection of said first flight path with said transition altitude, second distance computing means for providing a second distance signal representative of the lateral distance of said aircraft from said first waypoint, comparator means responsive to said first and second distance signals for providing a comparator signal in accordance with said second distance signal being less than said first distance signal, and a selection circuit responsive to said first and second flight path angle signal and said comparator signal for providing said first flight path angle signal to said vertical steeringsignal generating means when said second distance signal is less than said first distance signal and for providing said second flight path angle signal to said vertical steering signal generating means when said second distance signal is not less than said first distance signal.

17. The apparatus of claim 16 further including means for providing a first waypoint altitude signal representative of said altitude of said first waypoint, means for providing a second waypoint altitude signal representative of said altitude of said second waypoint, means for providing a total distance signal representative of the lateral distance between said first and second waypoints, and means for providing a transition altitude signal representative of said transition altitude.

18. The apparatus of claim 17 in which said means for providing said transition altitude signal comprises means for providing said transition altitude signal as a barometrically corrected altitude.

19. The apparatus of claim 28 further including transition altitude conversion means comprising means for providing a barometric correction signal, and means responsive to said transition altitude signal and said barometric correction signal for providing a converted transition altitude signal in terms of pressure altitude in accordance with said barometric correction signal.

20. The apparatus of claim 19 in which said first flight path angle computing means comprises means for providing said first flight path angle signal in accordance with a function of said first and second waypoint altitude signals and said total distance signal.

21. The apparatus of claim 20 in which said first flight path angle computing means comprises means for computing the function $$\alpha_A = \tan^{-1} \frac{H'_B - H'_A}{D_{TOTAL}}$$

where
$\alpha_A$ = said first flight path angle signal
$H'_A$ = said first waypoint altitude signal
$H'_B$ = said second waypoint altitude signal
$D_{TOTAL}$ = said total distance signal.

22. The apparatus of claim 19 in which said first distance computing means comprises means for providing said first distance signal in accordance with a function of said transition altitude signal, said first waypoint altitude signal and said first flight path angle signal.

23. The apparatus of claim 22 in which said first distance computing means comprises means for computing the function $$D_A = \frac{H_{TRANS} - H'_A}{\tan \alpha_A}$$

where
$D_A$ = said first distance signal
$H_{TRANS}$ = said transition altitude signal
$H'_A$ = said first waypoint altitude signal
$\alpha_A$ = said first flight path angle signal.

24. The apparatus of claim 19 in which said second flight path angle computing means comprises means for providing said second flight path angle signal in accordance with a function of said second waypoint altitude signal, said converted transition altitude signal, said total distance signal and said first distance signal.

25. The apparatus of claim 24 in which said second flight path angle computing means comprises means for computing the function $$\alpha_B = \tan^{-1} \frac{H_B - H'_{TRANS}}{D_{TOTAL} - D_A}$$

where
$\alpha_B$ = said second flight path angle signal
$H_B$ = said second waypoint altitude signal
$H'_{TRANS}$ = said converted transition altitude signal
$D_{TOTAL}$ = said total distance signal
$D_A$ = said first distance signal.

26. The apparatus of claim 15 in which said pitch axis control means includes an automatic flight control system responsive to said vertical steering signal for controlling said aircraft about the pitch axis thereof in accordance therewith.

27. The apparatus of claim 15 in which said pitch axis control means includes a flight director system responsive to said vertical steering signal and including an attitude director indicator with the vertical steering cue thereof driven in accordance therewith.

28. The apparatus of claim 15 in which said pitch axis control means includes a vertical deviation indicator driven in accordance with said deviations from said straight line flight path.

29. In an area navigation system for aircraft, apparatus for controlling the vertical flight path of the aircraft when descending from a first waypoint to a second waypoint through the transition altitude at which the aircraft altitude reference is changed from pressure altitude to barometrically corrected altitude, the altitude of said first waypoint being designated as pressure altitude and the altitude of said second waypoint being designated as barometrically corrected altitude, comprising first flight path angle computing means for providing a first flight path angle signal representative of a first flight path angle for a first straight line flight path from said first to said second waypoint at said altitudes designated therefor, second flight path angle computing means for providing a second flight path angle signal representative of a second flight path angle for a second straight line flight path from said first waypoint at said altitude designated therefor to the point of intersection of said first flight path with said transition altitude selection means responsive to said first and second flight path angle signals for selecting said second flight path angle signal when said aircraft is above said transition altitude and said first flight path angle signal when said aircraft is below said transition altitude, vertical steering signal generating means responsive to said selected flight path angle signal for providing a vertical steering signal in accordance with deviations from said straight line flight path defined by said selected flight path angle signal, and pitch axis control means responsive to said vertical steering signal for controlling the pitch attitude of said aircraft in accordance therewith.

30. The apparatus of claim 29 in which said selection means comprises first distance computing means for providing a first distance signal representative of the lateral distance between said first waypoint and said point of intersection of said first flight path with said transition altitude, second distance computing means for providing a second distance signal representative of the lateral distance of said aircraft from said first waypoint, comparator means responsive to said first and second distance signals for providing a comparator signal in accordance with said second distance signal being less than said first distance signal, and a selection circuit responsive to said first and second flight path angle signals and said comparator signal for providing said second flight path angle signal to said vertical steering signal generating means when said second distance signal is less than said first distance signal and for providing said first flight path angle signal to said vertical steering signal generating means when said second distance signal is not less than said first distance signal.

31. The apparatus of claim 30 further including means for providing a first waypoint altitude signal representative of said altitude of said first waypoint, means for providing a second waypoint altitude signal representative of said altitude of said second waypoint, means for providing a total distance signal representative of the lateral distance between said first and second waypoints, and means for providing a transition altitude signal representative of said transition altitiude.

32. The apparatus of claim 31 in which said means for providing said transition altitude signal comprises means for providing said transition altitude signal as a barometrically corrected altitude.

33. The apparatus of claim 32 further including transition altitude conversion means comprising means for providing a barometric correction signal, and means responsive to said transition altitude signal and said barometric correction signal for providing a converted transition altitude signal in terms of pressure altitude in accordance with said barometric correction signal.

34. The apparatus of claim 33 in which said first flight path angle computing means comprises means for providing said first flight path angle signal in accordance with a function of said first and second waypoint altitude signals and said total distance signal.

35. The apparatus of claim 34 in which said first flight path angle computing means comprises means for computing the function $$\alpha_B = \tan^{-1} \frac{H'_B - H'_A}{D_{TOTAL}}$$

where
$\alpha_B$ = said first flight path angle signal
$H'_A$ = said first waypoint altitude signal
$H'_B$ = said second waypoint altitude signal
$D_{TOTAL}$ = said total distance signal.

36. The apparatus of claim 33 in which said first distance computing means comprises means for providing said first distance signal in accordance with a function of said first waypoint altitude signal, said transition altitude signal and said first flight path angle signal.

37. The apparatus of claim 36 in which said first distance computing means comprises means for computing the function $$D_A = \frac{H'_A - H_{TRANS}}{\tan \alpha_B}$$

where
$D_A$ = said first distance signal
$H'_A$ = said first waypoint altitude signal
$H_{TRANS}$ = said transition altitude signal
$\alpha_B$ = said first flight path angle signal.

38. The apparatus of claim 33 in which said second flight path angle computing means comprises means for providing said second flight path angle signal in accordance with a function of said converted transition altitude signal, said first waypoint altitude signal and said first distance signal.

39. The apparatus of claim 38 in which said second flight path angle computing means comprises means for computing the function $$\alpha_A = \tan^{-1} \frac{H'_{TRANS} - H_A}{D_A}$$

where
- $\alpha_A$ = said second flight path angle signal
- $H'_{TRANS}$ = said converted transition altitude signal
- $H_A$ = said first waypoint altitude signal
- $D_A$ = said first distance signal.

40. The apparatus of claim 29 in which said pitch axis control means including an automatic flight control system responsive to said vertical steering signal for controlling said aircraft about the pitch axis thereof in accordance therewith.

41. The apparatus of claim 29 in which said pitch axis control means includes a flight director system responsive to said vertical steering signal and including an attitude director indicator with the vertical steering cue thereof driven in accordance therewith.

42. The apparatus of claim 29 in which said pitch axis control means includes a vertical deviation indicator driven in accordance with said deviations from said straight line flight path.

43. In an area navigation system for aircraft, apparatus for controlling the vertical flight path of the aircraft when ascending or descending from a first waypoint to a second waypoint through the transition altitude at which the aircraft altitude reference is changed from barometrically corrected altitude to pressure altitude in ascending flight and from pressure altitude to barometrically corrected altitude in descending flight, the altitude of the waypoint above said transition altitude being designated as pressure altitude and the altitude of the waypoint below said transition altitude being designated as barometrically corrected altitude, comprising
- first flight path angle computing means for providing a first flight path angle signal representative of a first flight path angle for a first straight line flight path from said first to said second waypoint at said altitudes designated therefor,
- second flight path angle computing means for providing a second flight path angle signal representative of a second flight path angle for a second straight line flight path from the point of intersection of said first flight path with said transition altitude to said second waypoint altitude at said altitude designated therefor for ascending flight and to said first waypoint altitude at said altitude designated therefor for descending flight,
- selection means responsive to said first and second flight path angle signals for selecting said first flight path angle signal when said aircraft is below said transition altitude and said second flight path angle signal when said aircraft is above said transition altitude,
- vertical steering signal generating means responsive to said selected flight path angle signal for providing a vertical steering signal in accordance with deviations from said straight line flight path defined by said selected flight path angle signal, and
- pitch axis control means responsive to said vertical steering signal for controlling the pitch attitude of said aircraft in accordance therewith.

44. The apparatus of claim 43 in which said selection means comprises
- first distance computing means for providing a first distance signal representative of the lateral distance between said first waypoint and said point of intersection of said first flight path with said transition altitude,
- second distance computing means for providing a second distance signal representative of the lateral distance of said aircraft from said first waypoint,
- comparator means responsive to said first and second distance signals for providing a comparator signal in accordance with said second distance signal being less than said first distance signal, and
- a selection circuit responsive to said first and second flight path angle signals and said comparator signal for providing said first flight path angle signal to said vertical steering signal generating means when said second distance signal and for providing said second flight path angle signal to said vertical steering signal generating means when said second distance signal is not less than said first distance signal for ascending flight and for providing said second flight path angle signal to said vertical steering signal generating means when said second distance signal is less than said first distance signal and for providing said first flight path angle signal to said vertical steering signal generating means when said second distance signal is not less than said first distance signal for descending flight.

45. The apparatus of claim 44 further including
- means for providing a first waypoint altitude signal representative of said altitude of said first waypoint,
- means for providing a second waypoint altitude signal representative of said latitude of said second waypoint, and
- means for providing a transition altitude signal representative of said transition altitude.

46. The apparatus of claim 45 including further comparator means responsive to said first and second waypoint altitude signals and said transition altitude signal for providing an ascending flight signal representative of said ascending flight of said aircraft when said second waypoint altitude signal is greater than said transition altitude signal and said first waypoint altitude signal is less than said transition altitude signal and for providing a descending flight signal representative of said descending flight of said aircraft when said second waypoint altitude signal is not greater than said transition altitude signal and said first waypoint altitude signal is greater than said transition altitude signal,
- said selection circuit being responsive to said ascending and descending flight signals for providing said first flight path angle signal to said vertical steering signal generating means when said second distance signal is less than said first distance signal and for providing said second flight path angle signal to said vertical steering signal generating means when said second distance signal is not less than said first distance signal in accordance with said ascending flight signal and for providing said second flight path angle signal to said vertical steering signal generating means when said second distance signal is less than said first distance signal and for providing said first flight path angle signal to said vertical steering signal generating means when said second distance signal is not less than said first distance signal in accordance with said descending flight signal.

47. In an area navigation system for aircraft, apparatus for controlling the vertical flight path of the aircraft when descending from a first waypoint to a second waypoint through the transition altitude below which the airspeed should be reduced to at most a maximum airspeed, said first and second waypoints having first and second altitudes associated therewith respectively, comprising transition distance computing means for providing a transition distance signal representative of a transition distance over which the airspeed is reduced from a first airspeed to said maximum airspeed, the deceleration beginning at a predetermined deceleration altitude, transition flight path angle computing means responsive to said transition distance signal for providing a transition flight path angle signal representative of a transition flight path angle for a straight line transition flight path from said deceleration altitude to said transition altitude in accordance with said transition distance signal, descent flight path angle computing means for providing a descent flight path angle signal representative of a descent flight path angle for a first straight line descent flight path segment from said first waypoint at said first waypoint altitude to the point of intersection of said transition flight path with said deceleration altitude and for a second straight line descent flight path segment from the point of intersection of said transition flight path with said transition altitude to said second waypoint at said second waypoint altitude, selection means responsive to said transition and descent flight path angle signals for selecting said descent flight path angle signal when said aircraft is above said deceleration altitude or below said transition altitude and said transition flight path angle signal when said aircraft is between said deceleration and transition altitudes.

vertical steering signal generating means responsive to said selected flight path angle signal for providing a vertical steering signal in accordance with deviations from said straight line flight path defined by said selected flight path angle signal, and pitch axis control means responsive to said vertical steering signal for controlling the pitch attitude of said aircraft in accordance therewith, the throttles of said aircraft being controlled to effect deceleration on said transition flight path to at most said maximum airspeed.

48. The apparatus of claim 47 in which said selection means comprises first distance computing means for providing a first distance signal representative of the lateral distance between said first waypoint and said point of intersection of said transition flight path with said deceleration altitude, second distance computing means for providing a second distance signal representative of the lateral distance of said aircraft from said first waypoint, summation means responsive to said first distance signal and said transition distance signal for providing a summation signal representative of the algebraic sum thereof, comparator means responsive to said first and second distance signals and said summation signal for providing comparator signals in accordance with said second distance signal being less than said first distance signal and in accordance with said second distance signal being less than said summation signal, and a selection circuit responsive to said transition and descent flight path angle signals and said comparator signals for providing said descent flight path angle signal to said vertical steering signal generating means when said second distance signal is less than said first distance signal and when said second distance signal is not less than said summation signal and for providing said transition flight path angle signal to said vertical steering signal generating means when said second distance signal is not less than said first distance signal and is less than said summation signal.

49. The apparatus of claim 48 further including means for providing a first waypoint altitude signal representative of said altitude of said first waypoint, means for providing a second waypoint altitude signal representative of said altitude of said second waypoint, means for providing a total distance signal representative of the lateral distance between said first and second waypoints, means for providing a deceleration altitude signal representative of said deceleration altitude, means for providing a transition altitude signal representative of said transition altitude, means for providing an actual airspeed signal representative of the actual airspeed of said aircraft, and means for providing a maximum airspeed signal representative of said maximum airspeed.

50. The apparatus of claim 49 in which said transition distance computing means comprises means for providing said transition distance signal in accordance with a function of said actual and said maximum airspeed signals.

51. The apparatus of claim 50 in which said transition distance computing means comprises means for computing the function $$D_{TRANS} = \frac{V_{AC}^2 - V_{MAX}^2}{4}$$

where $D_{TRANS}$ = said transition distance signal
$V_{AC}$ = said actual airspeed signal
$V_{MAX}$ = said maximum airspeed signal.

52. The apparatus of claim 49 in which said transition flight path angle computing means comprises means for providing said transition flight path angle signal in accordance with a function of said deceleration altitude signal, said transition altitude signal and said transition distance signal.

53. The apparatus of claim 52 in which said transition flight path angle computing means comprises means for computing the function $$\alpha_T = \tan^{-1} \frac{H_{DECEL} - H_{TRANS}}{D_{TRANS}}$$

where $\alpha_T$ = said transition flight path angle signal
$H_{DECEL}$ = said deceleration altitude signal
$H_{TRANS}$ = said transition altitude signal
$D_{TRANS}$ = said transition distance signal.

54. The apparatus of claim 49 in which said descent flight path angle computing means comprises means for providing said descent flight path angle signal in accordance with a function of said first waypoint altitude signal, said second waypoint altitude signal, said deceleration altitude signal, said transition altitude signal, said total distance signal and said transition distance signal.

55. The apparatus of claim 54 in which said descent flight path angle computing means comprises means for computing the function $$\alpha_B = \tan^{-1} \frac{H_B - H_A + H_{DECEL} - H_{TRANS}}{D_{TOTAL} - D_{TRANS}}$$

where
- $\alpha_B$ = said descent flight path angle signal
- $H_A$ = said first waypoint altitude signal
- $H_B$ = said second waypoint altitude signal
- $H_{DECEL}$ = said deceleration altitude signal
- $H_{TRANS}$ = said transition altitude signal
- $D_{TOTAL}$ = said total distance signal
- $D_{TRANS}$ = said transition distance signal.

56. The apparatus of claim 49 in which said first distance computing means comprises means for providing said first distance signal in accordance with a function of said deceleration altitude signal, said first waypoint altitude signal and said descent flight path angle signal.

57. The apparatus of claim 56 in which said first distance computing means comprises means for computing the function $$D_A = \frac{H_{DECEL} - H_A}{\tan \alpha_B}$$

where
- $D_A$ = said first distance signal
- $H_{DECEL}$ = said deceleration altitude signal
- $H_A$ = said first waypoint altitude signal
- $\alpha_b$ = said descent flight path angle signal.

58. The apparatus of claim 47 in which said pitch axis control means includes an automatic flight control system responsive to said vertical steering signal for controlling said aircraft about the pitch axis thereof in accordance therewith.

59. The apparatus of claim 47 in which said pitch axis control means includes a flight director system responsive to said vertical steering signal and including an attitude director indicator with the vertical steering cue thereof driven in accordance therewith.

60. The apparatus of claim 47 in which said pitch axis control means includes a vertical deviation indicator driven in accordance with said deviations from said straight line flight path.

* * * * *